US011758591B2

(12) United States Patent
Geng et al.

(10) Patent No.: US 11,758,591 B2
(45) Date of Patent: Sep. 12, 2023

(54) COMMUNICATION METHOD AND COMMUNICATIONS APPARATUS

(71) Applicant: Huawei Technologies Co., Ltd., Shenzhen (CN)

(72) Inventors: Tingting Geng, Shanghai (CN); Hongping Zhang, Shanghai (CN); Qinghai Zeng, Shanghai (CN); Le Yan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/036,924

(22) Filed: Sep. 29, 2020

(65) Prior Publication Data

US 2021/0014915 A1 Jan. 14, 2021

Related U.S. Application Data

(63) Continuation of application No. PCT/CN2019/081416, filed on Apr. 4, 2019.

(30) Foreign Application Priority Data

Apr. 4, 2018 (CN) .......................... 201810300559.4

(51) Int. Cl.
*H04W 76/11* (2018.01)
*H04W 76/15* (2018.01)
*H04W 84/02* (2009.01)

(52) U.S. Cl.
CPC ............ *H04W 76/11* (2018.02); *H04W 76/15* (2018.02); *H04W 84/02* (2013.01)

(58) Field of Classification Search
CPC ...... H04W 76/11; H04W 76/15; H04W 84/02
USPC ................ 370/329, 328, 338, 341, 345, 350
See application file for complete search history.

(56) References Cited

U.S. PATENT DOCUMENTS 9,226,204 B2    12/2015  Kuningas
9,788,275 B2 *  10/2017  Eo .................... H04W 52/0229
9,924,413 B2     3/2018  Adjakple et al.
10,200,919 B2 *  2/2019  Shi ........................ H04W 24/02
(Continued)

FOREIGN PATENT DOCUMENTS

CN          103636257 A      3/2014
CN          104160745 A     11/2014
(Continued)

OTHER PUBLICATIONS

"3rd Generation Partnership Project; Technical Specification Group Radio Access Network; NG-RAN; Xn application protocol (XnAP) (Release 15)," 3GPP TS 38.423 V0.7.0, Mar. 2018, 81 pages.
(Continued)

*Primary Examiner* — Nghi H Ly
(74) *Attorney, Agent, or Firm* — Slater Matsil, LLP

(57) ABSTRACT

A communication method and a communications apparatus, the method including receiving, by a second network device, from a third network device, first identification information of a first radio access network area to which a first cell corresponding to the third network device belongs, and sending, by the second network device, second identification information of the first cell and the first identification information of the first radio access network area to a first network device.

18 Claims, 8 Drawing Sheets

(56) References Cited

U.S. PATENT DOCUMENTS

| | | | |
|---|---|---|---|
| 10,897,708 | B2 | 1/2021 | Shih et al. |
| 2011/0089233 | A1* | 4/2011 | Locher ................... G06Q 50/10 235/380 |
| 2013/0208702 | A1 | 8/2013 | Sandberg |
| 2018/0234890 | A1* | 8/2018 | Shih ...................... H04W 60/00 |

FOREIGN PATENT DOCUMENTS

| | | |
|---|---|---|
| CN | 106879009 A | 6/2017 |
| CN | 107645753 A | 1/2018 |
| CN | 110832917 A | 2/2020 |
| JP | 2012507921 A | 3/2013 |
| KR | 20130021866 A | 3/2013 |
| WO | 2013136657 A1 | 9/2013 |
| WO | 2017161190 A1 | 9/2017 |
| WO | 2018145661 A1 | 8/2018 |

OTHER PUBLICATIONS

"Comparison and Discussion on RAN-based Notification Area Update," Agenda item: 10.4.1.5, Source: MTI, Document for. Discussion and Decision, 3GPP TSG-RAN WG2 RAN#97bis, R2-1702512, Spokane, USA, Apr. 3-7, 2017, 4 pages.

"RAN Notification Area for NR," Agenda item: 10.4.5.1, Source: Samsung, Document for: Discussion & Decision, 3GPP TSG-RAN WG2 Meeting #97bis, R2-1702511, Spokane, USA, Apr. 3-7, 2017, 4 pages.

"TP for TS 38.300," Agenda item: 10.11.1, Source: Nokia (rapporteur), Document for: Discussion and Decision, 3GPP TSG-RAN WG3 Meeting #96, R3-171932, Hangzhou, P. R. China, May 15-19, 2017, 8 pages.

"On RAN Initiated Paging," Source: Huawei, HiSilicon, Agenda Item: 8.9.4, Document for: Discussion, 3GPP TSG-RAN WG2 Meeting #96, R2-168246, Reno, Nevada, USA, Nov. 14-18, 2016, 5 pages.

"UE-initiated RAN-based Notification Area Update Procedure," Agenda item: 10.4.1.6.2, Source: MTI, Document for: Discussion and Decision, 3GPP TSG-RAN WG2 Meeting #99, R2-1707864, Berlin, Germany, Aug. 21-25, 2017, 5 pages.

Ma, H., "Research on MSC Pool Tecnology and the Solution of Called Recovery for Huawei Enterprise", Journal of Chongqing University of Science and Technology(Natural Sciences Edition), 2010, 4 pages (with English Abstract).

"Comparison and Discussion on RAN-based Notification Area Update," Agenda item: 10.4.1.5, Source: MTI, Documenl For: Discussion and Decision, 3GPP TSG-RAN WG2 RAN#97bis, R2-1702512, Spokane, USA, Apr. 3-7, 2017, 4 pages.

"Inactive State and RAN Based Notification Area," Source: CATT, Agenda Item: 10.5.2, Document for: Discussion and Decision, 3GPP TSG RAN WG3 Meeting #93bis, R3-162217, Sophia Antipolis, France, Oct. 10-14, 2016, 3 pages.

"TS 23.502: Fallback to CN paging Upon RAN Paging Failure," Source: Huawei, HiSilicon, Document for: Discussion/Approval, Agenda Item: 6.5.7.5, Work Item / Release: 5G_ph1 / Rel-15, SA WG2 Meeting #122 bis, S2-175556, Aug. 21-25, 2017, Sophia Antipolis, France, 6 pages.

"Response to R3-174734," Agenda Item: 10.6.3, Source: Nokia, Nokia Shanghai Bell, Document for: Discussions & Approval, 3GPP TSG-RAN WG3 Meeting #98, R3-174870, Reno, NV, U.S., Nov. 28-Dec. 1, 2017, 4 pages.

"TP for 38.423 on Xn Setup Procedure," Agenda Item: 10.3.3, Source: CATT, Documents for: Discussions & Approval, 3GPP TSG-RAN WG3 Meeting #97, R3-172800, Aug. 21-25, 2017, 8 pages.

"On Configuration of RNA as Subset of the Registration Area," Agenda Item: 10.6, Source: NEC, Document for: Discussion and Decision, 3GPP TSG-RAN WG3#97, R3-173032, Aug. 21-25, 2017, 4 pages.

"TP to 36.423 BL CR for Support of EN-DC Setup and Configuration Update," Source: Huawei, Agenda Item: 10.3.3, Document for: Approval, 3GPP TSG-RAN WG3 Meeting #98, R3-174553, Nov. 27-Dec. 1, 2017, 11 pages.

"Consideration on RAN-Based Notification Area," Agenda Item: 10.6.1, Source: Intel Corporation, Document for: Discussion and Decision, 3GPP TSG RAN WG3 AH-1801, R3-180454, Jan. 22-26, 2018, 4 pages.

"Xn Setup and NG-RAN Node Configuration Update," Source: Huawei, Agenda Item: 10.3.2, Document for: Discussion and Decision, 3GPP TSG-RAN NR#99, R3-180974, Feb. 26-Mar. 2, 2018, 3 pages.

"Essential Corrections for EN-DC," Source to WG: Huawei, Nokia, Nokia Shanghai Bell, Source to TSG: R3, Work Item Code: NR_newRAT-Core, Category: F, Date: Jan. 22, 2018, Release: Rel-15, Change Request, 36.423, CR 1051, Rev 1, Current Version: 15.0.0, 3GPP TSG-RAN3 Meeting #99, R3-181510, Feb. 26-Mar. 2, 2018, 21 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2019/081416, filed on Apr. 4, 2019, which claims priority to Chinese Patent Application No. 201810300559.4, filed on Apr. 4, 2018. The disclosures of the aforementioned applications are hereby incorporated by reference in their entireties.

TECHNICAL FIELD

This application relates to the field of communications technologies, and in particular, to a communication method and a communications apparatus.

BACKGROUND

In a communications system, a source network device sends information about a radio access network notification area (RAN Notification Area, RNA) to a terminal, the terminal enters an inactive state based on the information about the RNA, and the terminal may move in the RNA, or move out of the RNA. When the terminal moves in the RNA, the terminal may not send a radio access network notification area update (RNA Update, RNAU) notification message to the source network device, or may periodically send the RNAU notification message to the source network device. When the terminal moves out of the RNA, the terminal needs to send an RNAU notification message to a network device of a current serving cell, so that the network device knows that the terminal moves out of the RNA allocated by the source network device to the terminal.

In the prior art, after the source network device sends the information about the RNA to the terminal, a failure in paging the terminal is easily caused.

SUMMARY

Embodiments of this application provide a communication method and a communications apparatus, so that a network device or a core network node can successfully page a terminal.

According to a first aspect, this application provides a communication method. The method includes receiving, by a core network node from a first network device, information that is about a radio access network notification area RNA and that is sent by the first network device to a terminal, where the information about the RNA includes identification information of at least one radio access network area or identification information of at least one tracking area, and indicating, by the core network node to page the terminal, a network device of a cell corresponding to the radio access network area or the tracking area identified by the identification information. According to the solution provided in this embodiment, a case in which the terminal cannot be paged when the terminal in an inactive state moves out of the RNA configured by the first network device for the terminal may be avoided.

In a possible design, the method further includes receiving, by the core network node, identification information of at least one second network device from the first network device, where the second network device is a network device that fails to page the terminal, and the indicating, by the core network node to page the terminal, a network device of a cell corresponding to the radio access network area or the tracking area identified by the identification information includes indicating, by the core network node to page the terminal, a network device of the cell corresponding to the radio access network area or the tracking area identified by the identification information other than the at least one second network device. According to the solution provided in this embodiment, the first network device and the second network device may be prevented from repeatedly paging the terminal. Therefore, unnecessary paging overheads may be reduced, and network resources may be saved.

In a possible design, the method further includes receiving, by the core network node, first identification information of the terminal from the first network device, where the first identification information is used to uniquely identify the terminal in the RNA, and the indicating, by the core network node to send a paging message for paging the terminal, a network device of a cell corresponding to the radio access network area or the tracking area identified by the identification information includes indicating, by the core network node to send a first paging message, the network device of the cell corresponding to the radio access network area or the tracking area identified by the identification information, where the first paging message includes the first identification information.

In a possible design, the method further includes receiving, by the core network node, second identification information of the terminal from the first network device, where the second identification information includes any one of a system architecture evolution-temporary mobile subscriber identity (S-TMSI), an international mobile subscriber identity IMSI, or identification information determined based on the S-TMSI or the IMSI, and the indicating, by the core network node to send a paging message for paging the terminal, a network device of a cell corresponding to the radio access network area or the tracking area identified by the identification information includes indicating, by the core network node to send a second paging message, the network device of the cell corresponding to the radio access network area or the tracking area identified by the identification information, where the second paging message includes the second identification information. According to the solution provided in this embodiment, flexibility of paging the terminal by the network device may be improved.

In a possible design, the method further includes receiving, by the core network node from the first network device, a period in which the terminal listens to the first paging message or a sending period of the first paging message. According to the solution provided in this embodiment, the core network node may select a minimum sending period in which the terminal listens to a paging message, so as to improve a success rate of paging the terminal.

In a possible design, after the indicating, by the core network node to page the terminal, a network device of a cell corresponding to the radio access network area or the tracking area identified by the identification information, the method further includes if the network device of the cell corresponding to the radio access network area or the tracking area identified by the identification information fails to page the terminal, sending, by the core network node, second indication information to a network device in a tracking area allocated by the core network node to the terminal, where the second indication information is used to indicate, to send a second paging message for paging the terminal, the network device in the tracking area allocated by the core network node to the terminal. According to the solution provided in this embodiment, a success rate of paging the terminal may be further improved.

In a possible design, the method further includes receiving, by the core network node from a plurality of network devices, identification information of a radio access network area or a tracking area to which a cell corresponding to each network device belongs.

According to a second aspect, this application provides a communication method. The method includes sending, by a first network device, information about a radio access network notification area RNA to a terminal, where the information about the RNA includes identification information of at least one radio access network area or identification information of at least one tracking area, and sending, by the first network device, the information about the RNA to a core network node.

In a possible design, the method further includes sending, by the first network device, identification information of at least one second network device to the core network node, where the second network device is a network device that fails to page the terminal.

In a possible design, the method further includes sending, by the first network device, first identification information of the terminal to the core network node, where the first identification information is used to uniquely identify the terminal in the RNA.

In a possible design, the method further includes sending, by the first network device, second identification information of the terminal to the core network node, where the second identification information includes any one of a system architecture evolution-temporary mobile subscriber identity S-TMSI, an international mobile subscriber identity IMSI, or identification information determined based on the S-TMSI or the IMSI.

In a possible design, the method further includes sending, by the first network device to the core network node, a period in which the terminal listens to a first paging message or a sending period of the first paging message.

In a possible design, the method further includes sending, by the first network device to the core network node, identification information of a radio access network area or a tracking area to which a cell corresponding to the first network device belongs.

In a possible design, the method further includes sending, by the first network device to the core network node, an identifier of a cell corresponding to the first network device and identification information of a radio access network area to which the cell belongs, or sending, by the first network device to the core network node, an identifier of a cell corresponding to the first network device and identification information of a tracking area to which the cell belongs.

According to a third aspect, this application provides a communication method. The method includes determining, by a first network device, information that is about a radio access network notification area RNA and that is to be sent to a terminal, where the information about the RNA includes identification information of at least one first radio access network area or identification information of at least one first tracking area, and sending, by the first network device, the information about the RNA and identification information of at least one cell to the terminal. According to the solution provided in this embodiment, when downlink data or signaling arrives, a network device or a core network node can successfully page the terminal.

In a possible design, identification information of a radio access network area to which each of the at least one cell belongs to the identification information, of the at least one first radio access network area, that is included in the information about the RNA, or identification information of a tracking area to which each of the at least one cell belongs to the identification information, of the at least one first tracking area, that is included in the information about the RNA.

In a possible design, the method further includes receiving, by the first network device from a second network device, identification information of a radio access network area or a tracking area to which a cell corresponding to the second network device belongs, and/or receiving, by the first network device from a second network device, identification information of a radio access network area or a tracking area to which a cell corresponding to a third network device belongs.

In a possible design, the at least one cell is determined based on the cell corresponding to the second network device and/or the cell corresponding to the third network device.

In a possible design, the method further includes receiving, by the first network device from a core network node, identification information of at least one second radio access network area and identification information of a cell corresponding to identification information of each of the at least one second radio access network area, or receiving, by the first network device from a core network node, identification information of at least one second tracking area and identification information of a cell corresponding to each of the at least one second tracking area.

In a possible design, the at least one cell is determined based on the identification information of the at least one second radio access network area and the identification information of the cell corresponding to the identification information of each of the at least one second radio access network area, or the at least one cell is determined based on the identification information of the at least one second tracking area and the identification information of the cell corresponding to each of the at least one second tracking area.

According to a fourth aspect, this application provides a communication method. The method includes receiving information about a radio access network notification area RNA and identification information of at least one cell, where the information about the RNA includes identification information of at least one radio access network area or identification information of at least one tracking area, and determining, based on identification information of a current cell of a terminal and the identification information of the at least one cell, whether to send a radio access network notification area update RNAU notification message, where identification information of a radio access network area to which the current cell belongs to the identification information, of the at least one radio access network area, that is included in the information about the RNA, or identification information of a tracking area to which the current cell belongs to the identification information, of the at least one tracking area, that is included in the information about the RNA.

In a possible design, identification information of a radio access network area to which each of the at least one cell belongs to the identification information, of the at least one radio access network area, that is included in the information about the RNA, or identification information of a tracking area to which each of the at least one cell belongs to the identification information, of the at least one tracking area, that is included in the information about the RNA.

In a possible design, the identification information of the at least one cell is a blacklist, and the determining, based on identification information of a current cell of a terminal and the identification information of the at least one cell, whether to send a radio access network notification area update RNAU notification message includes if the identification information of the current cell is the same as identification information of the cell in the at least one cell, determining to send the RNAU notification message to a network device of the current cell. Therefore, a network device or a core network node determines a location of the terminal in a timely manner, and when the network device or the core network node needs to page the terminal, a paging area can be better determined, thereby saving signaling overheads.

In a possible design, the information of the at least one cell is a whitelist, and the determining, based on identification information of a current cell of a terminal and the identification information of the at least one cell, whether to send a radio access network notification area update RNAU notification message includes if the identification information of the current cell is different from identification information of each of the at least one cell, determining to send the RNAU notification message to a network device of the current cell. Therefore, a network device or a core network node determines a location of the terminal in a timely manner, and when the network device or the core network node needs to page the terminal, a paging area can be better determined, thereby saving signaling overheads.

According to a fifth aspect, this application provides a communications apparatus. The communications apparatus includes a module, a component, or a circuit configured to implement the communication method according to any one of the first to fourth aspects.

According to a sixth aspect, this application provides a communications apparatus. The communications apparatus includes a memory and a processor, where the memory is coupled to the processor, and the processor is configured to perform the method according to the first aspect, the second aspect, the third aspect, or the fourth aspect.

In a possible design, the communications apparatus in the fifth aspect or the sixth aspect may be a core network node, a base station, or a terminal, or may be a component (such as a chip or a circuit) of the core network node, the base station, or the terminal.

According to a seventh aspect, this application provides a computer readable storage medium. The computer readable storage medium stores a computer program, and when the computer program is run on a computer, the communications apparatus is enabled to perform the method according to the first aspect, the second aspect, the third aspect, or the fourth aspect.

According to an eighth aspect, this application provides a computer program. When the computer program is executed by a computer, the method according to the first aspect, the second aspect, the third aspect, or the fourth aspect is performed.

In a possible design, the program in the eleventh aspect may be all or partially stored on a storage medium packaged with a processor, or may be all or partially stored on a memory not packaged with the processor.

According to a ninth aspect, an embodiment of this application further provides a communications system. The communications system includes the communications apparatus according to the fifth aspect or the sixth aspect.

DETAILED DESCRIPTION OF ILLUSTRATIVE EMBODIMENTS

Some terms used in implementations of this application are merely used to explain specific embodiments of this application, but are not intended to limit this application.

Figure 1:
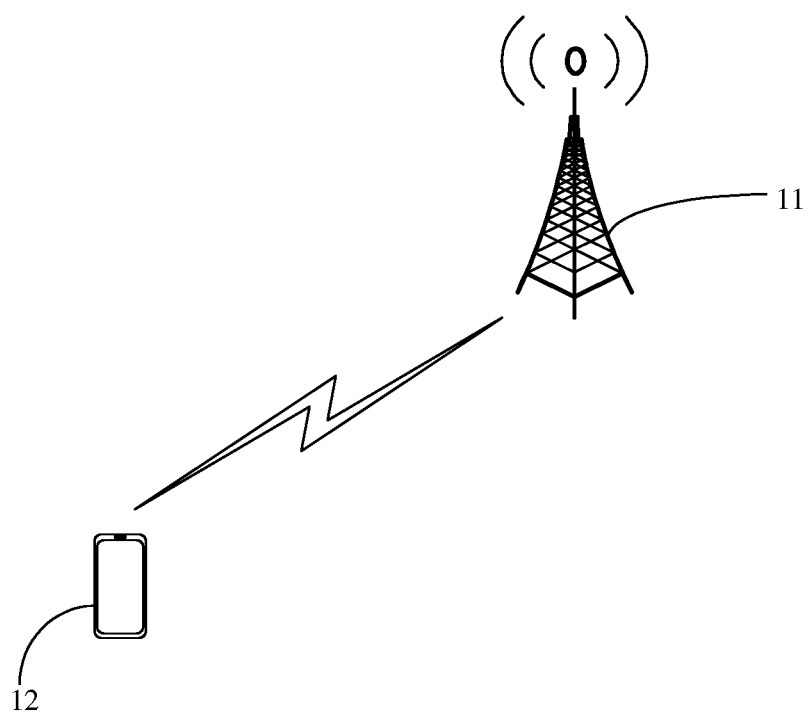
FIG. 1 is a schematic diagram of an application scenario according to an embodiment of this application.

The embodiments of this application may be applied to various types of communications systems. FIG. 1 is a schematic diagram of an application scenario according to an embodiment of this application. A communications system shown in FIG. 1 mainly includes a network device 11 and a terminal 12.

(1) The network device 11 may be a network side device, for example, an access point AP of wireless fidelity (Wi-Fi), or a base station in next-generation communication, such as a $5^{th}$ generation node B (gNB), a small cell, a micro base station, or a TRP in 5th generation communications (5G), or may be a relay station, an access point, a vehicle-mounted device, a wearable device, or the like. In the embodiments, communications systems of different communications standards include different base stations. For ease of distinction, a base station in a 4G communications system is referred to as a long term evolution (LTE) evolved nodeB (eNB), a base station in a 5G communications system is referred to as a new radio (NR) gNB, and a base station that supports both the 4G communications system and the 5G communications system is referred to as an eLTE eNB. These names are merely for convenience of distinction, and do not have a limitation meaning.

(2) The terminal 12, also referred to as user equipment (User Equipment, UE), is a device that provides a user with voice and/or data connectivity, for example, a handheld device or a vehicle-mounted device having a wireless connection function. Common terminals include, for example, a mobile phone, a tablet computer, a notebook computer, a palmtop computer, a mobile internet device (MID), and a wearable device, such as a smartwatch, a smart band, or a pedometer.

(3) "A plurality of" means two or more, and another quantifier is similar to this. The term "and/or" describes a correspondence between associated objects and represents that three relationships may exist. For example, A and/or B may represent the following three cases: Only A exists, both A and B exist, and only B exists. The character "/" generally indicates an "or" relationship between the associated objects.

It should be noted that a quantity and types of terminals 12 included in the communications system shown in FIG. 1 are merely examples, and the embodiments of this application are not limited thereto. For example, the communications system may further include more terminals 12 that communicate with the network device 11. For brief description, the terminals 12 are not described in the accompanying drawings one by one. In addition, although the network device 11 and the terminal 12 are shown in the communications system shown in FIG. 1, the communications system may not be limited to including the network device 11 and the terminal 12. For example, the communications system may further include a core network node or a device configured to carry a virtualized network function. This is obvious to a person skilled in the art, and details are not described herein.

In addition, the embodiments of this application may not only be applied to a next-generation wireless communications system, namely, the 5G communications system, but to another system that may appear in the future, such as a next-generation Wi-Fi network and a 5G internet of vehicles.

Generally, when a terminal is in an idle state, a radio resource control (RRC) connection between the terminal and a network device is disconnected, and there is no continuous data transmission between the terminal and the network device. Similar to the idle state, when the terminal is in an inactive state, the RRC connection between the terminal and the network device is also disconnected, and there is no continuous data transmission. The inactive state is a radio resource control (Radio Resource Control, RRC) state, and is also referred to as an RRC inactive state. A difference between the inactive state and the idle state lies in that when the terminal is in the inactive state, the terminal and an access network device store a context of the terminal, and the access network device sends information about a radio access network notification area (RAN Notification Area, RNA) to the terminal. Generally, an access network device that configures the terminal to enter the inactive state and stores the context of the terminal is a source network device or an anchor network device.

After the terminal receives the information about the RNA from the source network device and enters the inactive state, the terminal may be located in the RNA for a long time, or may move out of the RNA. Generally, when the terminal performs cell reselection and reselects another cell in the RNA, the terminal does not send a radio access network notification area update (RNA Update, RNAU) notification message to the source network device for a change of a serving cell. However, when the terminal moves out of the RNA, the terminal sends an RNAU notification message to a network device of a serving cell in which the terminal is currently located, to notify the network device that the terminal moves out of the originally configured RNA. Therefore, a network device or a core network node determines, in a timely manner, that the terminal moves out of the RNA allocated by the source base station to the terminal. When the network device or the core network node needs to page the terminal, a paging area may be better determined, thereby saving signaling overheads. In some scenarios, the source network device sends configuration information to the terminal that enters the inactive state, where the configuration information includes information used to indicate the terminal to periodically send an RNAU notification message, so that when the terminal moves in the RNA, the terminal may periodically send the RNAU notification message to the source network device. The periodic RNAU notification message may ensure that a status of the terminal recorded by the source network device is consistent with an actual status of the terminal.

The information that is about the RNA and that is sent by the source network device to the terminal may include the following several possible forms.

In a possible form, the information about the RNA is cell information. The cell information includes identification information of at least one cell, and the identification information of the at least one cell constitutes a cell list. Optionally, identification information of a cell may specifically include at least one of a cell global identifier (CGI), a physical cell identifier (PCI), and a cell identifier of the cell.

In another possible form, the information about the RNA is RAN area information. The RAN area information includes at least one radio access network (RAN) area identity (ID), and the at least one RAN area ID constitutes a RAN area ID list. Optionally, a RAN area ID may include a tracking area identity (TAI) and a RAN area code (RANAC), or the RAN area ID includes only the RANAC. An area identified by the RANAC includes one or more cells. Optionally, the RANAC is unique within a TAI range.

In still another possible form, the information about the RNA is tracking area information. The tracking area information includes at least one tracking area identity (TAI), and the at least one TAI constitutes a TAI list. Optionally, a TAI may include a public land mobile network (PLMN) identifier and a tracking area code (TAC), or the TAI includes only the tracking area code.

Both the RAN area ID and the TAI are area identification information of a cell. A difference lies in that the RAN area ID is perceived by an access network and the TAI is perceived by a core network. A tracking area includes one or more cells, and a RAN area may also include one or more cells. Optionally, a range of the RAN area is less than that of the tracking area TA.

Figure 2:
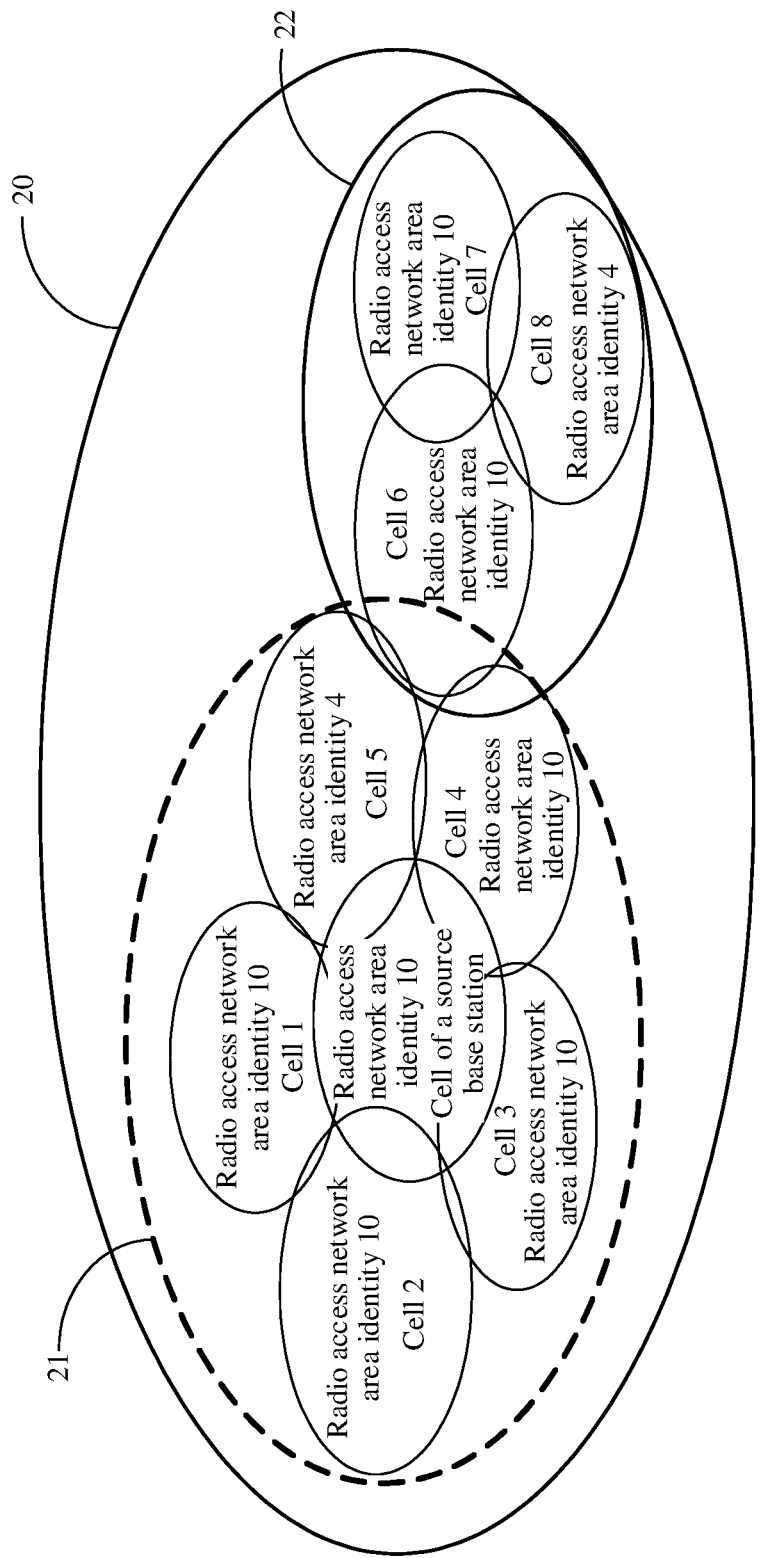
FIG. 2 is a schematic diagram of another application scenario according to an embodiment of this application.

In this embodiment, the information that is about the RNA and that is sent by the source network device to the terminal may include at least one RAN area ID or at least one TAI. For example, the information about the RNA includes at least one RAN area ID. As shown in FIG. 2, a tracking area TA 20 includes a plurality of cells, for example, a cell 0, a cell 1, a cell 2, a cell 3, a cell 4, a cell 5, a cell 6, a cell 7, and a cell 8. The cell 0 is a cell of a source base station, namely, a cell corresponding to the source base station. The source base station may send information about an RNA to the terminal, where the information about the RNA includes at least one RAN area ID, and the at least one RAN area ID may constitute a RAN area ID list. As shown in FIG. 2, the cell 1, the cell 2, the cell 3, the cell 4, and the cell 5 are adjacent cells of the cell of the source base station, and the cell 6, the cell 7, and the cell 8 are non-adjacent cells of the cell of the source base station. Optionally, there may be direct interfaces, such as Xn interfaces, between the source base station and base stations corresponding to the cell 1, the cell 2, the cell 3, the cell 4, and the cell 5. There are no direct interfaces between the source base station and base stations corresponding to the cell 6, the cell 7, and the cell 8. RAN area IDs respectively corresponding to the cell 1, the cell 2, the cell 3, and the cell 4 are 10, a RAN area ID corresponding to the cell 5 is 4, RAN area IDs respectively corresponding to the cell 6 and the cell 7 are 10, a RAN area ID corresponding to the cell 8 is 4, and a RAN area ID corresponding to the cell of the source base station is 10. There is a direct Xn interface between the source base station and a base station of an adjacent cell, and the source base station may obtain, through the Xn interface, a RAN area ID corresponding to the adjacent cell. Optionally, the information that is about the RNA and that is sent by the source base station to the terminal based on RAN area IDs corresponding to adjacent cells include the RAN area ID 10 and the RAN area ID 4, and the RAN area ID 10 and the RAN area ID 4 constitute a RAN area ID list.

However, when the terminal moves to a range shown in a solid-line area 22 in FIG. 2, because RAN area IDs respectively corresponding to the cell 6, the cell 7, and the cell 8 in the range shown in the solid-line area 22 are in the RAN area ID list sent by the source base station to the terminal, the terminal considers that the terminal does not move out of the RNA allocated by the source base station to the terminal, and therefore the terminal does not send an RNAU notification message to a base station of a serving cell in which the terminal is currently located.

For example, the terminal moves to the cell 6. Because the RAN area ID of the cell 6 is 10, the RAN area ID of the cell 6 is in the RAN area ID list sent by the source base station to the terminal. Similarly, when the terminal moves to the cell 8, because the RAN area ID of the cell 8 is 4, the RAN area ID of the cell 8 is in the RAN area ID list sent by the source base station to the terminal. To be specific, when the terminal moves to the range shown in the solid-line area 22, the terminal considers that the terminal does not move out of the RNA allocated by the source base station to the terminal, and therefore the terminal does not send the RNAU notification message. When a core network node sends, to the source base station, downlink data or signaling corresponding to the terminal, the source base station cannot successfully page the terminal. Consequently, the terminal cannot normally receive the downlink data or signaling. To resolve this problem, this application provides a communication method, to improve a success rate of paging the terminal. The following describes the communication method in combination with a specific application scenario.

Figure 3:
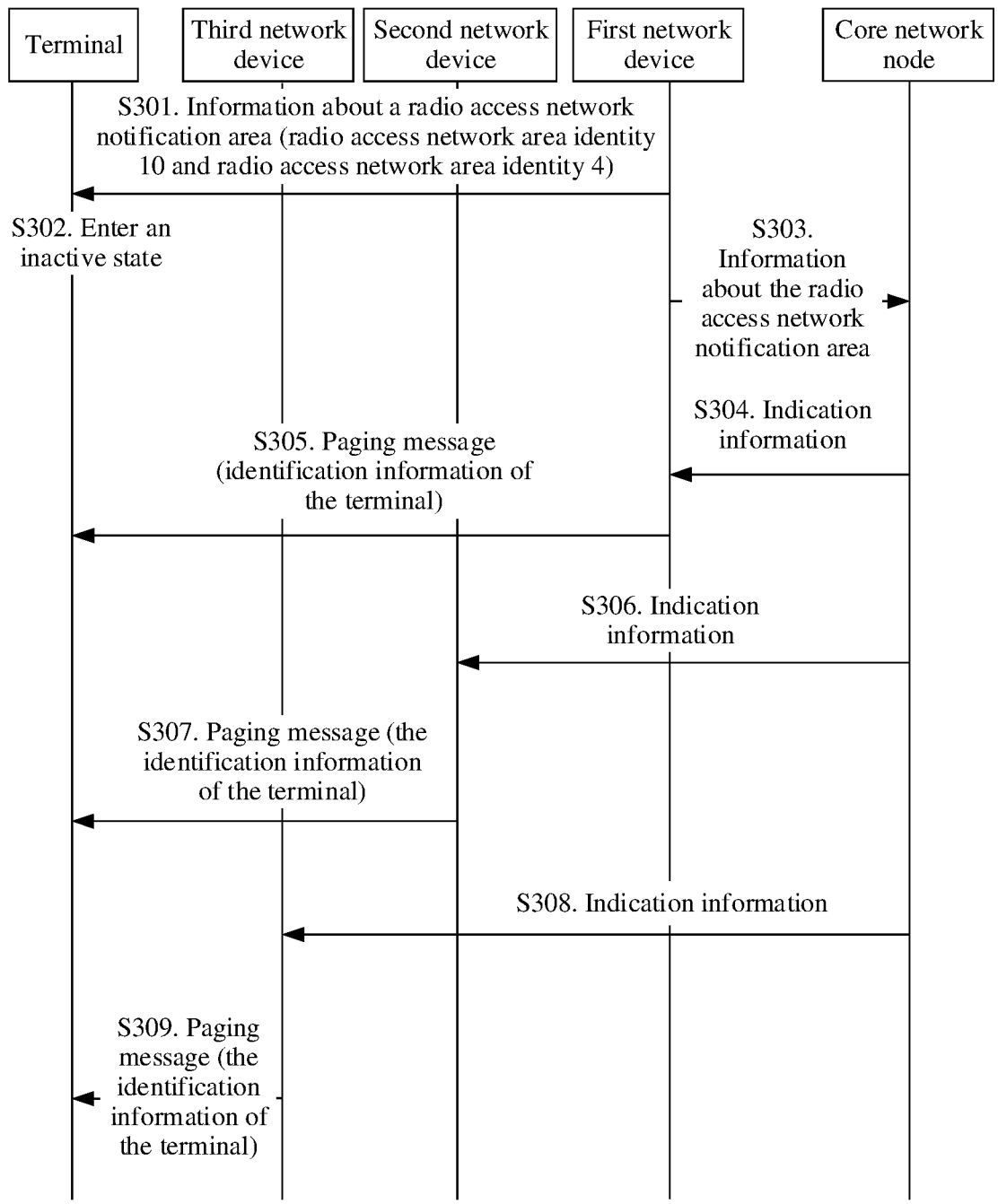
FIG. 3 is a schematic diagram of a communication method according to this application.

FIG. 3 is a schematic diagram of a communication method according to this application. As shown in FIG. 3, the communication method described in this embodiment is applicable to the application scenario shown in FIG. 2. In FIG. 3, a first network device may be a source base station that configures a terminal to enter an inactive state. A second network device may be specifically a base station that has a direct interface such as an Xn interface to the source base station. As shown in FIG. 2, the second network device may be specifically a base station corresponding to at least one of the cell 1, the cell 2, the cell 3, the cell 4, and the cell 5 that are adjacent to the cell of the source base station. A third network device may be specifically a base station that does not have a direct interface to the source base station. As shown in FIG. 2, the third network device may be specifically a base station corresponding to at least one of the cell 6, the cell 7, and the cell 8 that are not adjacent to the cell of the source base station. The communication method specifically includes the following steps.

Step S301: The first network device sends information about a radio access network notification area RNA to the terminal, where the information about the RNA includes a RAN area identity 10 and a RAN area identity 4.

In this embodiment, as shown in FIG. 2, an example in which the information about the RNA configured by the first network device for the terminal in the inactive state is RAN area information is used. In the scenario shown in FIG. 2, the RAN area information may include, for example, the RAN area identity 10 and the RAN area identity 4.

Step S302: The terminal enters the inactive state.

After receiving the information that is about the RNA and that is sent by the first network device, the terminal enters the inactive state.

Step S303: The first network device sends the information about the RNA to a core network node.

In this embodiment, the first network device sends the information about the RNA to the core network node after allocating the RNA to the terminal in the inactive state. Optionally, the first network device may also send the information about the RNA to the core network node when the terminal in the inactive state cannot be paged.

Herein, that the first network device sends the information about the RNA to the core network node after allocating the RNA to the terminal in the inactive state is used as an example. After receiving the information about the RNA from the first network device, the core network node determines, based on the RAN area identity 10 included in the information about the RNA, at least one cell corresponding to the RAN area identity 10, and determines, based on the RAN area identity 4 included in the information about the RNA, at least one cell corresponding to the RAN area identity 4.

Specifically, the core network node may determine, based on identification information of a cell and identification information of a RAN area to which the cell belongs, a network device of a cell corresponding to the RAN area identity 10 and a network device of a cell corresponding to the RAN area identity 4. For example, the core network node determines, based on a correspondence shown in the following Table 1, a network device that pages the terminal. It may be understood that the core network node may determine, as network devices that page the terminal, all network devices of cells corresponding to the RAN area identity 10 and the RAN area identity 4, or may determine, as network devices that page the terminal, some network devices of cells corresponding to the RAN area identity 10 and the RAN area identity 4. In a possible manner, the some network devices may be, for example, network devices in all the network devices of the cells corresponding to the RAN area identity 10 and the RAN area identity 4 other than a network device that fails to page the terminal.

The first network device may send, to the core network node, identification information of the network device that fails to page the terminal, so that the core network node learns of the network device that fails to page the terminal, and indicates, to page the terminal, a network device in network devices corresponding to the cell corresponding to the RAN area other than the network device that fails to page the terminal, so as to prevent, from repeatedly paging the terminal, the network device that fails in paging, thereby reducing unnecessary paging overheads and saving network resources.

In a possible manner, when sending the information about the RNA to the core network node, the first network device may further send, to the core network node, the identification information of the network device that fails to page the terminal.

TABLE 1

| Identification information of a cell | Identification information of a RAN area |
|---|---|
| Cell ID 0 | RAN area ID 10 |
| Cell ID 1 | RAN area ID 10 |
| Cell ID 2 | RAN area ID 10 |
| Cell ID 3 | RAN area ID 10 |
| Cell ID 4 | RAN area ID 10 |
| Cell ID 5 | RAN area ID 4 |
| Cell ID 6 | RAN area ID 10 |
| Cell ID 7 | RAN area ID 10 |
| Cell ID 8 | RAN area ID 4 |

It may be understood that the correspondence shown in Table 1 may be determined by the core network node by using identification information of a cell and RAN area ID information corresponding to the cell, where the identification information of the cell and the RAN area ID information corresponding to the cell are received from a network device. The network device is not limited to the first network device, the second network device, and the third network device, and the network device may be further another network device other than the first network device, the second network device, and the third network device.

The core network node determines, based on the correspondence shown in Table 1, that cells corresponding to the RAN area identity 10 includes a cell 0, a cell 1, a cell 2, a cell 3, a cell 4, a cell 6, and a cell 7, and cells corresponding to the RAN area identity 4 includes a cell 5 and a cell 8. There are direct interfaces between the source base station and base stations corresponding to the cell 1, the cell 2, the cell 3, the cell 4, and the cell 5, and the base stations corresponding to the cell 1, the cell 2, the cell 3, the cell 4, and the cell 5 may be referred to as second network devices in this embodiment. There are no direct interfaces between the source base station and base stations corresponding to the cell 6, the cell 7, and the cell 8, and the base stations corresponding to the cell 6, the cell 7, and the cell 8 may be referred to as third network devices in this embodiment. The core network node may indicate all network devices or some network devices in the first network device, the second network device, and the third network device to page the terminal. For a manner of indicating the first network device, the second network device, and the third network device to page the terminal, refer to steps S304 and S305, S306 and S307, and S308 and S309.

Step S304: The core network node sends indication information to the first network device.

Step S305: The first network device sends a paging message for paging the terminal, where the paging message includes identification information of the terminal.

Step S306: The core network node sends indication information to the second network device.

Step S307: The second network device sends a paging message for paging the terminal, where the paging message includes identification information of the terminal.

Step S308: The core network node sends indication information to the third network device.

Step S309: The third network device sends a paging message for paging the terminal, where the paging message includes identification information of the terminal.

As described in the foregoing steps S304 to S309, the core network node separately sends indication information to the first network device, the second network device, and the third network device, to separately indicate the first network device, the second network device, and the third network device to send paging messages for paging the terminal. The indication information may be used to indicate the first network device, the second network device, and the third network device to send first paging messages, for example, paging messages triggered by a RAN (RAN based paging). Alternatively, the indication information may also be used to indicate the first network device, the second network device, and the third network device to send second paging messages, for example, paging messages triggered by a core network (CN) (CN based paging). It may be understood that the indication information is described based on a function, and the indication information may be an explicit indication, an implicit message name, or an information element indication.

After receiving the indication information from the core network node, the first network device, the second network device, and the third network device send the corresponding paging messages based on an indication of the indication information. If the paging message is the RAN based paging, the RAN based paging includes first identification information of the terminal. The first identification information may uniquely identify the terminal in the RNA. If the paging message is the CN based paging, the CN based paging includes second identification information of the terminal. The second identification information of the terminal may be any one of a system architecture evolution-temporary mobile subscriber identity (S-TMSI) corresponding to the terminal, an international mobile subscriber identity (IMSI) corresponding to the terminal, or identification information that is determined based on the S-TMSI or the IMSI and that is corresponding to the terminal.

It should be noted that an execution sequence of step S304, step S306, and step S308 is not limited in this embodiment, and an execution sequence of step S305, step S307, and step S309 is not limited. It may be understood that, when the core network device indicates some network devices (for example, the third network device) to page the terminal, S304 to S307 may not be performed.

Optionally, when separately sending the indication information to the first network device, the second network device, and the third network device, the core network node may add the second identification information of the terminal to the indication information. The first network device, the second network device, and the third network device respectively send, based on the indication information, the second paging messages for paging the terminal. The second paging messages include the second identification information of the terminal.

In a possible manner, descriptions in step S304 to step S309 in this embodiment of this application may be a possible procedure after a procedure in which the first network device sends the information about the RNA to the core network node and the core network node receives, from another network element, downlink data or signaling corresponding to the terminal.

In another possible manner, descriptions in step S303 to step S309 in this embodiment of this application may be a possible procedure after a procedure in which after the first network device allocates the RNA to the terminal in the inactive state, the first network device receives, from the core network node, downlink data or signaling corresponding to the terminal and fails to page the terminal. This is not limited in this embodiment of this application.

In addition, this embodiment is described by using an example in which the information that is about the RNA and that is sent by the source base station to the terminal is the RAN area information. This embodiment is further applicable to a scenario in which the information about the RNA is tracking area information or a scenario in which the information about the RNA is other configuration. A specific implementation is similar to the implementation of the embodiment shown in FIG. 3, and details are not described herein again.

In this embodiment, the first network device sends, to the core network node, the information about the RNA allocated by the first network device to the terminal in the inactive state, where the information about the RNA may include at least one radio access network RAN area identity. The core network node determines a cell corresponding to the RAN area identity, and indicates a network device of the corresponding cell to page the terminal, so as to avoid a case in which the terminal cannot be paged when the terminal in the inactive state moves out of the RNA configured by the first network device for the terminal, so that downlink signaling or data of the terminal can be sent to the terminal in a timely manner, thereby improving service experience of the terminal.

Based on the foregoing embodiment, the first network device may further send the identification information of the terminal to the core network node, where the identification information of the terminal may be the first identification information or the second identification information. The first identification information and the second identification information are specifically described in the foregoing embodiment, and details are not described herein again.

FIG. 3 is used as an example. In step S303, the first network device may send the information about the RNA and the first identification information of the terminal to the core network node. In step S304, the indication information sent by the core network node to the first network device is used to indicate the first network device to send the first paging message, such as the RAN based paging, for paging the terminal. In step S305, the paging message sent by the first network device is specifically the RAN based paging, and the RAN based paging includes the first identification information of the terminal. Step S306 to step S309 are similar to this, and details are not described herein again.

Alternatively, in step S303, the first network device may send the information about the RNA and the second identification information of the terminal to the core network node. In step S304, the indication information sent by the core network node to the first network device is used to indicate the first network device to send the second paging message, such as the CN based paging, for paging the terminal. In step S305, the paging message sent by the first network device is specifically the CN based paging, and the CN based paging includes the second identification information of the terminal. Step S306 to step S309 are similar to this, and details are not described herein again.

In this embodiment, the first network device sends the first identification information or the second identification information of the terminal to the core network node, and the core network node may indicate the network device to send the first paging message or the second paging message for paging the terminal, thereby improving flexibility of paging the terminal by the network device.

In addition, based on the foregoing embodiment, the first network device may further send, to the core network node, a period in which the terminal listens to the first paging message or a sending period of the first paging message.

FIG. 3 is used as an example. In step S303, the first network device may send the information about the RNA, the first identification information of the terminal, and the paging configuration information to the core network node. In step S306 and step S308, the indication information sent by the core network node to the second network device and the third network device is specifically first indication information, and the first indication information includes the first identification information of the terminal and the paging configuration information. In step S307 and step S309, the second network device and the third network device may send, based on the paging configuration information, first paging messages to the terminal within the period in which the terminal listens to the first paging message, so that the terminal can normally receive the first paging messages, thereby improving a success rate of paging the terminal.

Based on FIG. 3, after the core network node indicates all or some network devices in the first network device, the second network device, and the third network device to page the terminal, and all the indicated network devices fail to page the terminal, the core network node may further send second indication information to a network device in a tracking area allocated by the core network node to the terminal, where the second indication information is used to indicate, to send a second paging message for paging the terminal, the network device in the tracking area allocated by the core network node to the terminal. Because the tracking area allocated by the core network node to the terminal is larger than the RNA allocated by the source base station to the terminal, when the core network node indicates a base station in the tracking area TA to page the terminal, the base station can page the terminal in a larger range, thereby further improving a success rate of paging the terminal.

It may be understood that some or all of the steps or operations in the foregoing embodiment are merely examples. Other operations or variations of various operations may be performed in the embodiments of this application. In addition, the steps may be performed in a sequence different from that shown in the foregoing embodiment, and not all the operations in the foregoing embodiment are necessarily performed.

In another possible embodiment, the following describes a method for establishing, by a core network node, a correspondence between an identifier of a cell and an identity of a RAN area to which the cell belongs. The method includes the following several feasible implementations.

Figure 4:
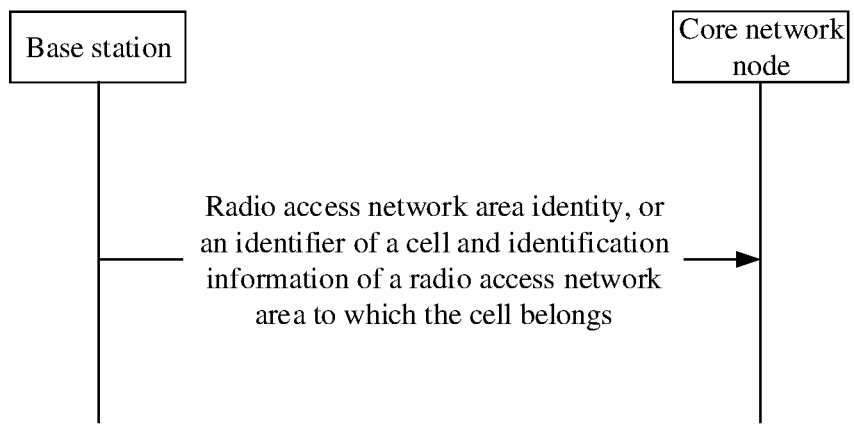
FIG. 4 is a schematic diagram of another communication method according to this application.

In a feasible implementation, as shown in FIG. 4, a base station sends a RAN area identity and identification information of a cell to a core network node. The RAN area identity is an identity of a RAN area to which a cell corresponding to the base station belongs. The core network node establishes a correspondence between an identifier of the cell and the RAN area identity based on the cell corresponding to the base station.

Optionally, the base station is corresponding to one cell, and the base station sends, to the core network node, a RAN area identity corresponding to the cell.

Optionally, the base station is corresponding to a plurality of cells, RAN areas to which all of the plurality of cells belong have a same identity, in other words, the plurality of cells are corresponding to the same RAN area ID, and the base station sends, to the core network node, the RAN area ID corresponding to the plurality of cells. The core network node establishes a correspondence between the RAN area ID and an identifier of each of the plurality of cells.

In another feasible implementation, as shown in FIG. 4, a base station sends, to a core network node, identification information of a cell and identification information of a RAN area to which the cell belongs.

Optionally, the base station may be corresponding to a plurality of cells, and RAN areas to which all of the plurality of cells belong have different identities, in other words, the plurality of cells are corresponding to different RAN area IDs. For example, the base station is corresponding to a cell 1 and a cell 2, a RAN area ID corresponding to the cell 1 is 1, and a RAN area ID corresponding to the cell 2 is 2. The base station sends identification information of the cell 1 and the RAN area ID 1, and identification information of the cell 2 and the RAN area ID 2 to the core network node. It may be understood that the plurality of cells corresponding to the base station may belong to a same RAN area. This is not limited in this embodiment of this application.

Optionally, the base station may be corresponding to one cell 1. The cell may belong to different RAN areas, in other words, the cell is corresponding to a plurality of different RAN area IDs. For example, the cell is corresponding to a RAN area ID 1 and a RAN area ID 2, and the base station sends identification information 1 of the cell, the RAN area ID 1, and the RAN area ID 2 to the core network node. Alternatively, the base station sends the identification information 1 of the cell and the RAN area ID 1, and the identification information 1 of the cell and the RAN area ID 2 to the core network node.

It may be understood that the base station in this embodiment may be the first network device, the second network device, or the third network device in the foregoing embodiment, or may be another network device. This is not specifically limited in this embodiment.

It should be noted that this embodiment is described by using an example in which information that is about an RNA and that is sent by a source base station to a terminal is RAN area information. This embodiment is further applicable to a scenario in which the information about the RNA is tracking area information or a scenario in which the information about the RNA is other configuration.

Optionally, the base station may add any one of the following information to an interface establishment request message or a base station configuration update message sent to the core network node: a RAN area identity, identification information of a cell, identification information of a RAN area to which the cell belongs, a tracking area identity, identification information of a cell, and identification information of a tracking area of the cell.

It may be understood that the method for establishing, by a core network node, a correspondence between an identifier of a cell and an identity of a RAN area to which the cell belongs in the foregoing embodiment is applicable to the method embodiment shown in FIG. 3, or may be independent of the method embodiment shown in FIG. 3, and is applicable to another scenario in which the correspondence may be applied. This is not limited in this embodiment of this application.

Figure 5:
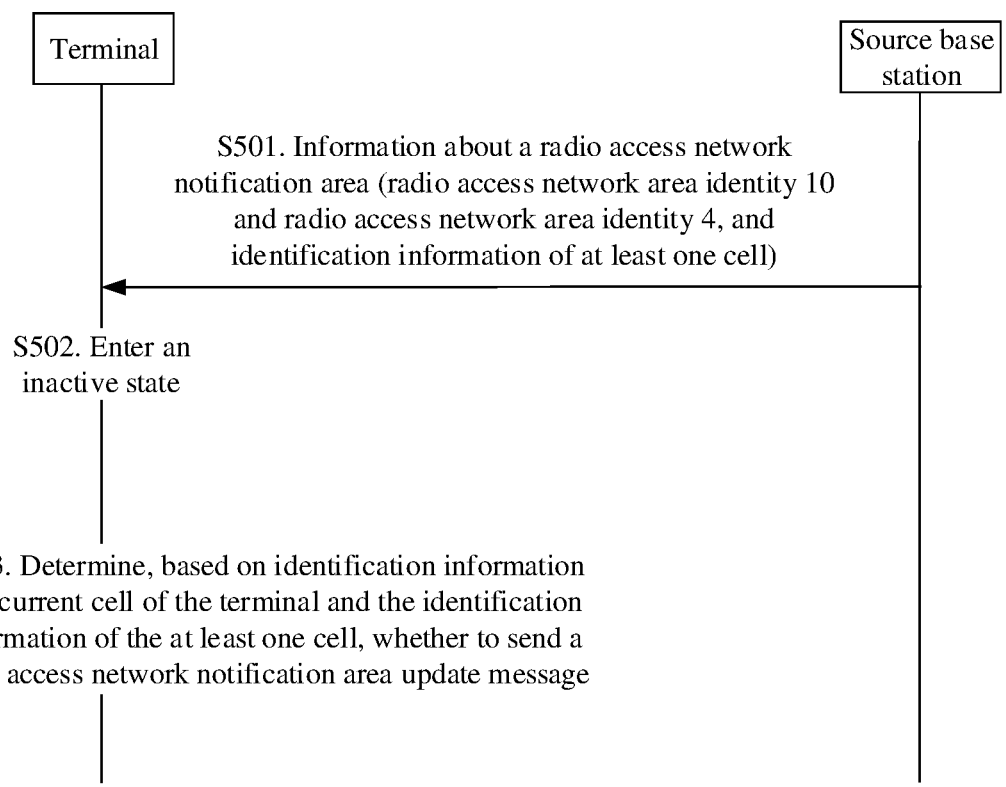
FIG. 5 is a schematic diagram of another communication method according to this application.

FIG. 5 is a schematic diagram of another communication method according to this application. As shown in FIG. 5, the communication method may include the following steps.

Step S501: A source base station sends information about an RNA and identification information of at least one cell to a terminal.

In this embodiment, an example in which the information that is about the RNA and that is sent by the source base station to the terminal is RAN area information is used. The RAN area information includes a RAN area identity 10 and a RAN area identity 4. In addition, the source base station further sends the identification information of the at least one cell to the terminal, where identification information of a radio access network area to which each of the at least one cell belongs to identification information, of at least one radio access network area, that is included in the information about the RNA. Optionally, a PLMN identifier of each of the at least one cell belongs to a PLMN identifier of at least one cell in the RNA. For example, the identification information, of the at least one cell, that is sent by the source base station to the terminal is identification information of the cell 1, the cell 2, the cell 3, the cell 4, and the cell 5 shown in FIG. 2. RAN area IDs corresponding to the cell 1, the cell 2, the cell 3, and the cell 4 are 10, and the RAN area ID 10 belongs to the RAN area identity 10 and the RAN area identity 4 that are included in the information that is about the RNA and that is sent by the source base station to the terminal. A RAN area ID 4 corresponding to the cell 5 also belongs to the RAN area identity 10 and the RAN area identity 4 that are included in the information that is about the RNA and that is sent by the source base station to the terminal. Optionally, in this embodiment, a list including the identification information of the cell 1, the cell 2, the cell 3, the cell 4, and the cell 5 is referred to as a whitelist. In a possible manner, a cell in the whitelist may be an adjacent cell of a cell corresponding to the source base station. Alternatively, in another possible manner, a base station corresponding to the cell in the whitelist has a direct interface, such as an Xn interface, to the source base station.

Alternatively, the identification information, of the at least one cell, that is sent by the source base station to the terminal is identification information of the cell 6, the cell 7, and the cell 8 shown in FIG. 2. RAN area IDs corresponding to the cell 6 and the cell 7 are 10, and the RAN area ID 10 belongs to the RAN area identity 10 and the RAN area identity 4 that are included in the information that is about the RNA and that is sent by the source base station to the terminal. A RAN area ID 4 corresponding to the cell 8 also belongs to the RAN area identity 10 and the RAN area identity 4 that are included in the information that is about the RNA and that is sent by the source base station to the terminal. Optionally, in this embodiment, a list including the identification information of the cell 6, the cell 7, and the cell 8 is referred to as a blacklist. In a possible manner, a cell in the blacklist is a non-adjacent cell of a cell corresponding to the source base station. Alternatively, in another possible manner, a base station corresponding to the cell in the blacklist does not have a direct interface, such as an Xn interface, to the source base station.

In this embodiment, identification information of a cell may be a cell global identifier (Cell Global Identifier, CGI), and the CGI is used to uniquely identify the cell. Alternatively, identification information of a cell may be a cell identifier, and the cell identifier is used to uniquely identify the cell in a PLMN. Alternatively, identification information of a cell may be a physical cell identifier (Physical Cell Identifier, PCI) and a frequency channel number. If a cell is identified by using a cell identifier or PCI and a frequency channel number, the cell may be uniquely identified with reference to a RAN area ID corresponding to the cell, in other words, the cell is uniquely identified by using the PCI, the frequency channel number, and the RAN area ID.

Step S502: The terminal enters an inactive state.

After receiving the information about the RNA and the identification information of the at least one cell from the source base station, the terminal enters the inactive state.

Step S503: The terminal determines, based on identification information of a current cell of the terminal and the identification information of the at least one cell, whether to send an RNAU notification message.

The terminal in the inactive state may move in cells corresponding to the RAN area ID 10 and the RAN area ID 4, or may move out of the cells corresponding to the RAN area ID 10 and the RAN area ID 4.

In this embodiment of this application, in a scenario in which identification information of a radio access network area to which the current cell of the terminal belongs to the identification information, of the at least one radio access network area, that is included in the information that is about the RNA and that is sent by the source base station to the terminal, for example, the identification information of the radio access network area to which the current cell of the terminal belongs is the RAN area ID 10, and the RAN area ID 10 belongs to the identification information, of the at least one radio access network area, that is included in the information that is about the RNA and that is sent by the source base station to the terminal. Alternatively, the identification information of the radio access network area to which the current cell of the terminal belongs is the RAN area ID 10, and the RAN area ID 10 is the same as the RAN area ID 10 in the information about the RNA configured by the source base station for the terminal. As shown in FIG. 2, the current cell may be one of the cell 1, the cell 2, the cell 3, the cell 4, the cell 6, and the cell 7. If the identification information of the radio access network area to which the current cell of the terminal belongs is the RAN area ID 4, the current cell may be the cell 5 or the cell 8.

That the terminal determines, based on identification information of a current cell of the terminal and the identification information of the at least one cell, whether to send an RNAU notification message includes the following several possible cases.

In a possible case, the identification information of the at least one cell is used to indicate the terminal to camp on any one of cells corresponding to the identification information of the at least one cell, and send the RNAU notification message to a base station of the cell on which the terminal currently camps. For example, in a possible manner, the at least one cell is a non-adjacent cell of the cell corresponding to the source base station. For example, the identification information, of the at least one cell, that is sent by the source base station to the terminal is the identification information of the cell 6, the cell 7, and the cell 8. Optionally, the cell 6, the cell 7, and the cell 8 are non-adjacent cells of the cell corresponding to the source base station. Alternatively, it may be understood that the source base station sends the blacklist to the terminal in this case. In this case, if identification information of the cell on which the terminal currently camps is the same as identification information of a cell in the blacklist, the terminal sends the RNAU notification message to the base station of the cell on which the terminal currently camps.

For example, the terminal camps on the cell 6, the RAN area ID corresponding to the cell 6 is 10, and the RAN area ID 10 belongs to the identification information, of the at least one radio access network area, that is included in the information that is about the RNA and that is sent by the source base station to the terminal. Alternatively, the RAN area ID 10 corresponding to the cell 6 is the same as the RAN area ID 10 in the information about the RNA configured by the source base station for the terminal. In this case, the identification information, of the at least one cell, that is received by the terminal is the identification information of the cell 6, the cell 7, and the cell 8, in other words, the identification information of the cell 6 is in the blacklist. Therefore, the terminal sends the RNAU notification message to a base station corresponding to the cell 6, so that a network device or a core network node determines location information of the terminal.

In a possible case, the identification information of the at least one cell is used to indicate the terminal to camp on any cell other than cells corresponding to the identification information of the at least one cell, and send the RNAU notification message to a base station of the cell on which the terminal currently camps. For example, in a possible manner, the at least one cell may be an adjacent cell of the cell corresponding to the source base station. For example, the identification information, of the at least one cell, that is sent by the source base station to the terminal is the identification information of the cell 1, the cell 2, the cell 3, the cell 4, and the cell 5. Optionally, the cell 1, the cell 2, the cell 3, the cell 4, and the cell 5 are adjacent cells of the cell corresponding to the source base station. Alternatively, it may be understood that the source base station sends the whitelist to the terminal in this case. In this case, if identification information of the cell on which the terminal currently camps is different from identification information of each cell in the whitelist, the terminal sends the RNAU notification message to the base station of the cell on which the terminal currently camps.

For example, the terminal camps on the cell 6, the RAN area ID corresponding to the cell 6 is 10, and the RAN area ID 10 belongs to the identification information, of the at least one radio access network area, that is included in the information that is about the RNA and that is sent by the source base station to the terminal. Alternatively, the RAN area ID 10 corresponding to the cell 6 is the same as the RAN area ID 10 in the information about the RNA configured by the source base station for the terminal. In this case, the identification information, of the at least one cell, that is received by the terminal is the identification information of the cell 1, the cell 2, the cell 3, the cell 4, and the cell 5, in other words, the identification information of the cell 6 is not in the whitelist. Therefore, the terminal sends the RNAU notification message to a base station corresponding to the cell 6, so that a network device or a core network node determines location information of the terminal.

It may be understood that, in a scenario in which identification information of a radio access network area to which the current cell of the terminal belongs does not belong to the identification information, of the at least one radio access network area, that is included in the information that is about the RNA and that is sent by the source base station to the terminal, the terminal sends the RNAU notification message to a network device of the current cell.

In a possible manner, whether the identification information, of the at least one cell, that is sent by the source base station to the terminal is the whitelist or the blacklist may be agreed on in advance by using a communications protocol.

In addition, in another implementation, the source base station may further send indication information to the terminal, where the indication information is used to indicate whether the identification information, of the at least one cell, that is sent by the source base station to the terminal is the whitelist or the blacklist. The source base station may simultaneously send the indication information and the identification information of the at least one cell to the terminal, or may successively send the indication information and the identification information of the at least one cell to the terminal.

It may be understood that this embodiment is described by using an example in which the information that is about the RNA and that is sent by the source base station to the terminal is the RAN area information. This embodiment is further applicable to a scenario in which the information about the RNA is tracking area information or a scenario in which the information about the RNA is other configuration. A specific implementation is similar to the implementation of the embodiment shown in FIG. 5, and details are not described herein again.

In this embodiment, the source base station sends the information about the RNA and the identification information of the at least one cell to the terminal. The identification information of the at least one cell may constitute the whitelist or the blacklist. When the terminal enters a cell in the blacklist or leaves a cell in the whitelist, the terminal sends the RNAU notification message to a base station in a current cell, so that the network device or the core network node determines location information of the terminal, and when downlink data or signaling arrives, the network device or the core network node can successfully page the terminal.

To distinguish the identification information, of the at least one radio access network area, that is included in the information that is about the RNA and that is sent by the source base station to the terminal in the foregoing embodiment from identification information, of at least one radio access network area, that is sent by the core network node to the source base station in a subsequent embodiment, the identification information, of the at least one radio access network area, that is included in the information that is about the RNA and that is sent by the source base station to the terminal in the foregoing embodiment is referred to as identification information of at least one first radio access network area, and the identification information, of the at least one radio access network area, that is sent by the core network node to the source base station in the subsequent embodiment is referred to as identification information of at least one second radio access network area. Similarly, identification information, of at least one tracking area, that is included in the information that is about the RNA and that is sent by the source base station to the terminal in the foregoing embodiment is referred to as identification information of at least one first tracking area, and identification information, of at least one tracking area, that is sent by the core network node to the source base station in the subsequent embodiment is referred to as identification information of at least one second tracking area.

In a possible embodiment, the source base station may determine, by using the following several feasible implementations, the identification information, of the at least one cell, that is sent to the terminal.

In a feasible implementation, the source base station receives, from the core network node, the identification information of the at least one second radio access network area and identification information of a cell corresponding to identification information of each of the at least one second radio access network area, and determines the identification information of the at least one cell based on the identification information of the at least one second radio access network area and the identification information of the cell corresponding to the identification information of each of the at least one second radio access network area.

Optionally, the core network node may further send, to the source base station, identification information of a base station of the cell corresponding to each second radio access network area. The source base station may determine, based on the identification information of the base station, whether there is a direct interface between the source base station and the base station. The direct interface may be an original interface, or may be an interface newly established by the source base station based on the identification information of the base station.

In this embodiment, identification information of a second radio access network area may be the same as or different from identification information of a first radio access network area. For example, the core network node receives, in a manner shown in FIG. 4, an identifier of a cell corresponding to a base station and identification information of a RAN area to which the cell belongs. The base station may be a base station corresponding to the cell 0, the cell 1, the cell 2, the cell 3, the cell 4, or the cell 5, or may be a base station corresponding to the cell 6, the cell 7, or the cell 8. The core network node may determine, based on cell identifiers respectively corresponding to the cell 0, the cell 1, the cell 2, the cell 3, the cell 4, the cell 6, and the cell 7 and RAN area IDs respectively corresponding to the cell 0, the cell 1, the cell 2, the cell 3, the cell 4, the cell 6, and the cell 7, the RAN area ID 10 and identification information of cells corresponding to the RAN area ID 10. Similarly, the core network node may determine the RAN area ID 4 and identification information of cells corresponding to the RAN area ID 4. In addition, as shown in FIG. 4, the base station may be further a base station of another cell, and a RAN area ID corresponding to the another cell is, for example, 3. The core network node may further determine the RAN area ID 3 and identification information of a cell corresponding to the RAN area ID 3.

For example, the core network node sends, to the source base station, the RAN area ID 10, the identification information of the cells corresponding to the RAN area ID 10, the RAN area ID 4, and the identification information of the cells corresponding to the RAN area ID 4. For example, the core network node sends {RAN area ID 10; cell 1, cell 2, cell 3, cell 4, cell 6, and cell 7} and {RAN area ID 4; cell 5 and cell 8} to the source base station. The source base station determines, based on the RAN area ID 10, the identification information of the cells corresponding to the RAN area ID 10, the RAN area ID 4, and the identification information of the cells corresponding to the RAN area ID 4, that there are no direct interfaces between the source base station and base stations corresponding to the cell 6, the cell 7, and the cell 8, and the source base station may use the cell 6, the cell 7, and the cell 8 as the blacklist. Alternatively, the source base station uses the cell 0, the cell 1, the cell 2, the cell 3, the cell 4, and the cell 5 as the whitelist.

Optionally, the core network node may further send identification information of base stations corresponding to the foregoing cells to the source base station. In an implementation, it is assumed that each base station is corresponding to only one cell, and identification information of the base station is corresponding to identification information of the cell. For example, identification information of the source base station is 0, and identification information of the cell 0 corresponding to the source base station is 0. The core network node sends {RAN area ID 10; (base station 1, cell 1), (base station 2, cell 2), (base station 3, cell 3), (base station 4, cell 4), (base station 6, cell 6), (base station 7, cell 7)}, and {RAN area ID 4; (base station 5, cell 5) and (base station 8, cell 8)} to the source base station. The source base station determines, based on RAN area IDs, identification information of cells, and identification information of base stations that are received from the core network node, that there are no direct interfaces between the source base station and the base station 6, the base station 7, and the base station 8, and the source base station may use the cell 6, the cell 7, and the cell 8 as the blacklist. Alternatively, the source base station uses the cell 0, the cell 1, the cell 2, the cell 3, the cell 4, and the cell 5 as the whitelist.

Optionally, before sending the RAN area IDs and the identification information of the cells corresponding to the RAN area IDs to the source base station, the core network node may receive RAN area ID information sent by a base station. Based on a request of the base station, the core network node selectively sends a corresponding RAN area ID and identification information of a cell corresponding to the RAN area ID, thereby reducing signaling overheads between the base station and the core network node. For example, in this embodiment, if the source base station sends the RAN area ID 10 to the core network node, the core network node sends only the RAN area ID 10 and the identification information of the cells corresponding to the RAN area ID 10 to the source base station.

Optionally, the identification information of the at least one second radio access network area and the identification information of the cell corresponding to the identification information of each of the at least one second radio access network area that are sent by the core network node to the source base station may be included in at least one type of signaling: an initial context setup request (INITIAL CONTEXT SETUP REQUEST), a terminal context modification request (UE CONTEXT MODIFICATION REQUEST), and a path switch request response (PATH SWITCH REQUEST ACKNOWLEDGE). In addition, the signaling is not limited to the foregoing signaling.

It may be understood that this embodiment is described by using an example in which the source base station receives, from the core network node, the identification information of the at least one second radio access network area and the identification information of the cell corresponding to the identification information of each of the at least one second radio access network area. In addition, this embodiment is further applicable to a scenario in which the source base station receives, from the core network node, the identification information of the at least one second tracking area and identification information of a cell corresponding to each of the at least one second tracking area, and determines the identification information of the at least one cell based on the identification information of the at least one second tracking area and the identification information of the cell corresponding to each of the at least one second tracking area. A specific implementation is similar to the implementation of this embodiment, and details are not described herein again.

In another feasible implementation, the source base station receives, from a second network device, identification information of a cell corresponding to the second network device and identification information of a radio access network area or a tracking area to which the cell belongs. Optionally, the source base station may further receive, from a second network device, identification information of the second network device, and/or the source base station receives, from a second network device, identification information of a cell corresponding to a third network device and identification information of a radio access network area or a tracking area to which the cell belongs. Optionally, the source base station may further receive identification information of the third network device. The identification information of the third network device and the identification information of the radio access network area or the tracking area to which the cell corresponding to the third network device belongs may be directly received by the second network device from the third network device, or may be indirectly obtained from another network device. This is not limited in this embodiment of this application.

Figure 6:
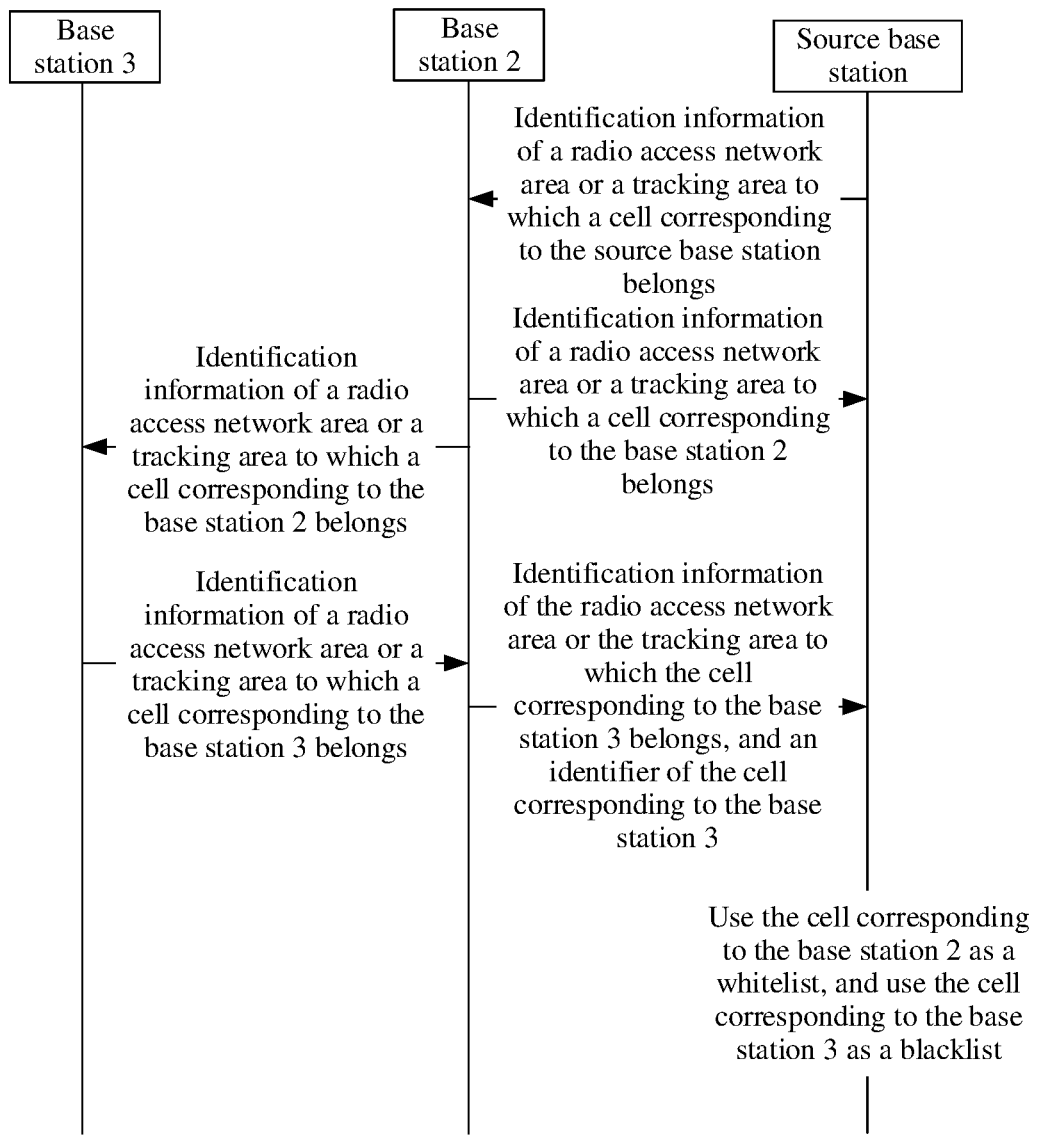
FIG. 6 is a schematic diagram of another communication method according to this application.

As shown in FIG. 6, there is a direct Xn interface between a source base station 1 and a second network device such as a base station 2, there is no direct Xn interface between the source base station 1 and a third network device such as a base station 3, and there is a direct Xn interface between the base station 2 and the base station 3. The source base station 1 and the base station 2 may exchange, through the Xn interface, identification information of RAN areas or TAs to which cells corresponding to the source base station 1 and the base station 2 belong. For example, the source base station 1 may send, to the base station 2 through the Xn interface, identification information of a RAN area or a TA to which a cell corresponding to the source base station 1 belongs, and the base station 2 may send, to the source base station 1 through the Xn interface, identification information of a RAN area or a TA to which a cell corresponding to the base station 2 belongs. The base station 2 and the base station 3 may exchange, through the Xn interface, identification information of RAN areas or TAs to which cells corresponding to base station 2 and the base station 3 belong. The base station 2 may further send, to the source base station 1, identification information of a RAN area or a TA to which a cell corresponding to the base station 3 belongs. Alternatively, the base station 2 may further send, to the base station 3, the identification information of the RAN area or the TA to which the cell corresponding to the base station 1 belongs. For example, the identification information of the RAN area to which the cell 1 corresponding to the source base station 1 belongs is a RAN area ID 10, and the source base station 1 determines that the identification information of the RAN area to which the cell 2 corresponding to the base station 2 belongs is the RAN area ID 10 and that the identification information of the RAN area to which the cell 3 corresponding to the base station 3 belongs is the RAN area ID 10. Optionally, the source base station 1 determines, based on identification information of the base station 3, that there is no direct Xn interface between the source base station 1 and the base station 3. When information that is about an RNA and that is sent by the source base station 1 to a terminal includes the RAN area ID 10, identification information of the cell 3 corresponding to the base station 3 may be used as a blacklist, or identification information of the cell 2 corresponding to the base station 2 may be used as a whitelist.

It may be understood that this embodiment is described by using an example in which the information that is about the RNA and that is sent by the source base station to the terminal is RAN area information. This embodiment is further applicable to a scenario in which the information about the RNA is tracking area information or a scenario in which the information about the RNA is other configuration. A specific implementation is consistent with the implementation of the embodiment shown in FIG. 6, and details are not described herein again.

It may be understood that, in this embodiment of this application, in a process in which one base station (base station A) sends a RAN area identity or identification information of a TA to another base station (base station B), the base station A also sends identification information of the base station A to the base station B. For example, as shown in FIG. 6, the base station 2 may not only send, to the source base station 1 through the Xn interface, the identification information of the RAN area or the TA to which the cell corresponding to the base station 2 belongs, but also send identification information of the base station 2 to the source base station 1.

In this embodiment, the source base station sends the information about the RNA and the identification information of at least one cell to the terminal, and the RNAU notification message is sent and notified to the network device or the core network node in a timely manner based on a current location of the terminal, so that the network device or the core network node can find the terminal when downlink data or signaling arrives.

It may be understood that some or all of the steps or operations in the foregoing embodiment are merely examples. Other operations or variations of various operations may be performed in the embodiments of this application. In addition, the steps may be performed in a sequence different from that shown in the foregoing embodiment, and not all the operations in the foregoing embodiment are necessarily performed.

It may be understood that, in the foregoing embodiments, an operation or step implemented by a terminal may also be implemented by a component (such as a chip or a circuit) that may be used for the terminal, an operation or step implemented by a core network node may also be implemented by a component (such as a chip or a circuit) that may be used for the core network node, and an operation or step implemented by a network device (such as a first network device, a second network device, and a third network device) may also be implemented by a component (such as a chip or a circuit) that may be used for the network device.

Figure 7:
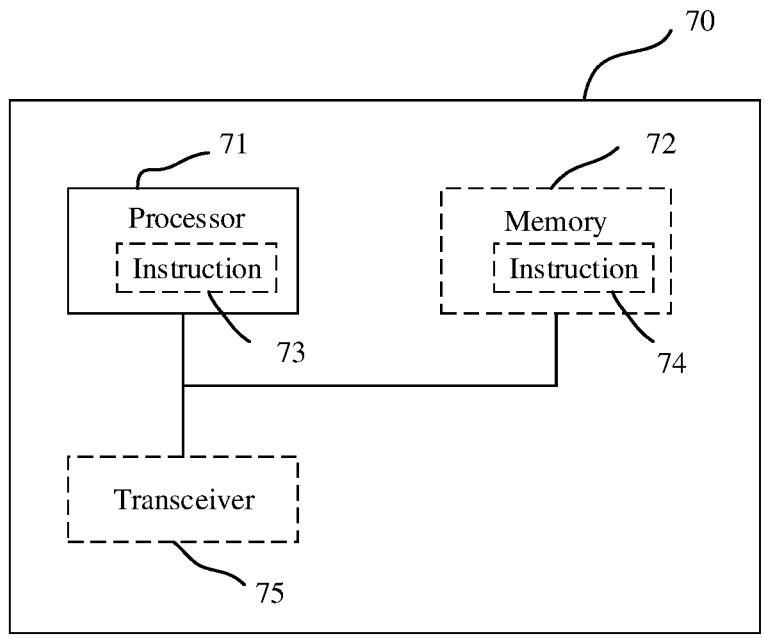
FIG. 7 is a schematic structural diagram of a communications apparatus according to an embodiment of this application.

FIG. 7 is a schematic structural diagram of a communications apparatus. The communications apparatus may be configured to implement a method corresponding to a network device (for example, a first network device, a second network device, or a third network device), a method corresponding to a terminal, or a method corresponding to a core network node in the foregoing method embodiments. For details, refer to descriptions in the foregoing method embodiments.

A communications apparatus 70 may include one or more processors 71. The processor 71 may also be referred to as a processing unit, and can implement a specific control function. The processor 71 may be a general-purpose processor, a dedicated processor, or the like.

In an optional design, the processor 71 may also store an instruction 73, and the instruction may be run by the processor, so that the communications apparatus 70 performs the method that is corresponding to the terminal, the network device, or the core network node and that is described in the foregoing method embodiments.

In another possible design, the communications apparatus 70 may include a circuit. The circuit may be used to implement a transmitting function, a receiving function, or a communication function in the foregoing method embodiments.

Optionally, the communications apparatus 70 may include one or more memories 72. The memory 72 stores an instruction 74 or intermediate data. The instruction 74 may be run by the processor, so that the communications apparatus 70 performs the methods described in the foregoing method embodiments. Optionally, the memory may further store other related data. Optionally, the processor may also store an instruction and/or data. The processor and the memory may be disposed separately, or may be integrated together.

Optionally, the communications apparatus 70 may further include a transceiver 75.

The processor 71 may be referred to as the processing unit. The transceiver 75 may be referred to as a transceiver unit, a transceiver, a transceiver circuit, a transceiver, or the like, and is configured to implement a transmitting and receiving function of the communications apparatus.

If the communications apparatus is configured to implement an operation corresponding to the core network node in the embodiment shown in FIG. 3, for example, the transceiver may receive, from a first network device, information that is about a radio access network notification area RNA and that is sent by the first network device to a terminal, and indicate, to page the terminal, a network device of a cell corresponding to a radio access network area or a tracking area identified by the identification information. The transceiver may further complete another corresponding communication function. The processor is configured to complete a corresponding determining or control operation. Optionally, a corresponding instruction may be further stored in the memory. For specific processing manners of the components, refer to related descriptions in the foregoing embodiments.

If the communications apparatus is configured to implement an operation corresponding to the first network device in FIG. 3, for example, the transceiver of the first network device may send information about a radio access network notification area RNA to a terminal, and send the information about the RNA to a core network node. The transceiver may further complete another corresponding communication function. The processor is configured to complete a corresponding determining or control operation. Optionally, a corresponding instruction may be further stored in the memory. For specific processing manners of the components, refer to related descriptions in the foregoing embodiments.

If the communications apparatus is configured to implement an operation corresponding to the first network device in the embodiment shown in FIG. 5, the processor is configured to determine information that is about a radio access network notification area RNA and that is to be sent to a terminal, and the transceiver is configured to send the information about the RNA and identification information of at least one cell to the terminal. Optionally, the transceiver may be further configured to complete another related communication operation, and the processor may be further configured to complete another corresponding determining or control operation, for example, determining information about the at least one cell. Optionally, a corresponding instruction may be further stored in the memory. For specific processing manners of the components, refer to related descriptions in the foregoing embodiments.

If the communications apparatus is configured to implement an operation corresponding to the terminal in the embodiment shown in FIG. 5, the transceiver is configured to receive information about a radio access network notification area RNA and identification information of at least one cell, and the processor is configured to determine, based on identification information of a current cell of the terminal and the identification information of the at least one cell, whether to send a radio access network notification area update RNAU notification message. Optionally, the transceiver may be further configured to complete another related communication operation, and the processor may be further configured to complete another corresponding determining or control operation. Optionally, a corresponding instruction may be further stored in the memory. For specific processing manners of the components, refer to related descriptions in the foregoing embodiments.

The processor and the transceiver described in this application may be implemented on an integrated circuit (IC), an analog IC, a radio frequency integrated circuit RFIC, a mixed signal IC, an application-specific integrated circuits (ASIC), a printed circuit board (PCB), an electronic device, or the like. The processor and transceiver may be manufactured by using various IC process technologies such as complementary metal-oxide-semiconductor (CMOS), N-channel metal oxide semiconductor NMOS), p-channel metal oxide semiconductor (PMOS), bipolar junction transistor (BJT), bipolar CMOS (BiCMOS), silicon germanium (SiGe), and gallium arsenide (GaAs).

Optionally, the communications apparatus may be an independent device or may be part of a larger device. For example, the device may be (1) an independent integrated circuit IC, a chip, a chip system, or a subsystem, (2) a set of one or more ICs, where optionally, the IC set may also include a storage component for storing data and/or an instruction, (3) an ASIC, such as a modem (MSM), (4) a module that may be embedded in another device, (5) a receiver, a terminal, a cellular phone, a wireless device, a handset, a mobile unit, a network device, and the like, or (6) another device, and the like.

Figure 8:
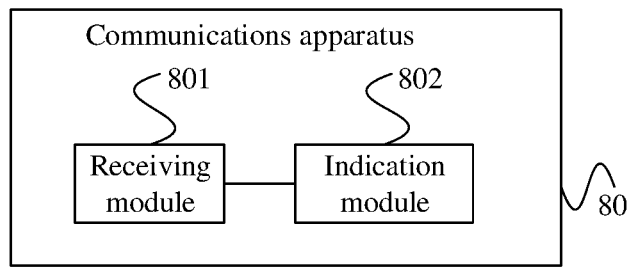
FIG. 8 is a schematic structural diagram of another communications apparatus according to an embodiment of this application.

FIG. 8 is a schematic structural diagram of a communications apparatus according to an embodiment of this application. As shown in FIG. 8, the communications apparatus 80 includes a receiving module 801 and an indication module 802. The receiving module 801 is configured to receive, from a first network device, information that is about a radio access network notification area RNA and that is sent by the first network device to a terminal. The indication module 802 is configured to indicate, to page the terminal, a network device of a cell corresponding to a radio access network area or a tracking area identified by the identification information.

In FIG. 8, further, the receiving module 801 may be further configured to receive identification information of at least one second network device from the first network device, where the second network device is a network device that fails to page the terminal. The indication module 802 is specifically configured to indicate, to page the terminal, a network device in network devices of the cell corresponding to the radio access network area or the tracking area identified by the identification information other than the at least one second network device.

In a possible manner, the receiving module 801 may be further configured to receive first identification information of the terminal from the first network device, where the first identification information is used to uniquely identify the terminal in the RNA. The indication module 802 may be configured to indicate, to send a first paging message, the network device of the cell corresponding to the radio access network area or the tracking area identified by the identification information, where the first paging message includes the first identification information.

In another possible manner, the receiving module 801 may be further configured to receive second identification information of the terminal from the first network device, where the second identification information includes any one of a system architecture evolution-temporary mobile subscriber identity S-TMSI, an international mobile subscriber identity IMSI, or identification information determined based on the S-TMSI or the IMSI. The indication module 802 may be configured to indicate, to send a second paging message, the network device of the cell corresponding to the radio access network area or the tracking area identified by the identification information, where the second paging message includes the second identification information.

Optionally, the receiving module 801 may be further configured to receive, from the first network device, a period in which the terminal listens to the first paging message or a sending period of the first paging message.

Optionally, the communications apparatus may further include a sending module, configured to when all the indicated network devices fail to page the terminal, send second indication information to a network device in a tracking area allocated by the communications apparatus to the terminal, where the second indication information is used to indicate, to send a second paging message for paging the terminal, the network device in the tracking area allocated by the communications apparatus to the terminal.

Optionally, the receiving module 801 may be further configured to receive, from a plurality of network devices, identification information of a radio access network area or a tracking area to which a cell corresponding to each network device belongs.

The communications apparatus in the embodiment shown in FIG. 8 may be configured to execute the technical solutions in the foregoing method embodiments. For implementation principles and technical effects of the communications apparatus, refer to related descriptions in the method embodiments. Optionally, the communications apparatus may be a core network node, or may be a component (such as a chip or a circuit) of the core network node.

Figure 9:
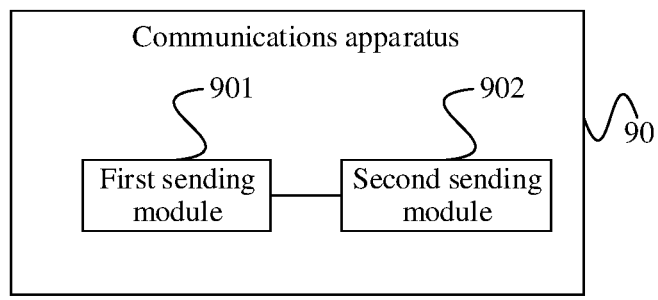
FIG. 9 is a schematic structural diagram of another communications apparatus according to an embodiment of this application.

FIG. 9 is a schematic structural diagram of another communications apparatus according to an embodiment of this application. As shown in FIG. 9, the communications apparatus 90 includes a first sending module 901 and a second sending module 902. The first sending module 901 is configured to send information about a radio access network notification area RNA to a terminal, where the information about the RNA includes identification information of at least one radio access network area or identification information of at least one tracking area. The second sending module 902 is configured to send the information about the RNA to a core network node.

In FIG. 9, the second sending module 902 is further configured to send identification information of at least one second network device to the core network node, where the second network device is a network device that fails to page the terminal.

In a possible manner, the second sending module 902 may be further configured to send first identification information of the terminal to the core network node, where the first identification information is used to uniquely identify the terminal in the RNA.

In another possible manner, the second sending module 902 may be further configured to send second identification information of the terminal to the core network node, where the second identification information includes any one of a system architecture evolution-temporary mobile subscriber identity S-TMSI, an international mobile subscriber identity IMSI, or identification information determined based on the S-TMSI or the IMSI.

Optionally, the second sending module 902 may be further configured to send, to the core network node, a period in which the terminal listens to a first paging message or a sending period of the first paging message.

Optionally, the second sending module 902 may be further configured to send, to the core network node, identification information of a radio access network area or a tracking area to which a cell corresponding to the communications apparatus belongs.

Optionally, the second sending module 902 is further configured to send, to the core network node, an identifier of a cell corresponding to the communications apparatus and identification information of a radio access network area to which the cell belongs, or send, to the core network node, an identifier of a cell corresponding to the communications apparatus and identification information of a tracking area to which the cell belongs.

The communications apparatus in the embodiment shown in FIG. 9 may be configured to execute the technical solutions in the foregoing method embodiments. For implementation principles and technical effects of the communications apparatus, refer to related descriptions in the method embodiments. Optionally, the communications apparatus may be a base station, or may be a component (such as a chip or a circuit) of the base station.

Figure 10:
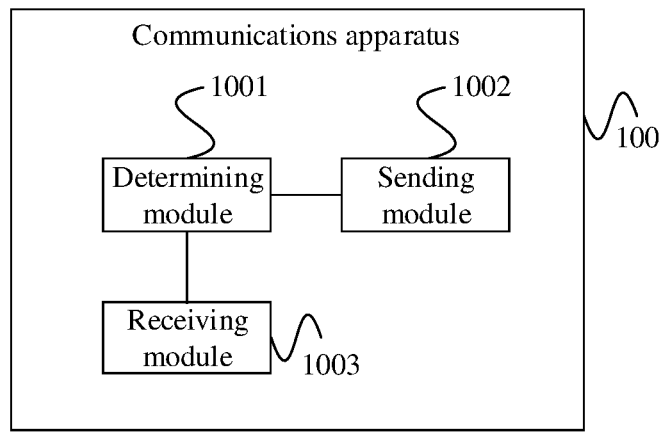
FIG. 10 is a schematic structural diagram of another communications apparatus according to an embodiment of this application.

FIG. 10 is a schematic structural diagram of another communications apparatus according to an embodiment of this application. As shown in FIG. 10, the communications apparatus 100 includes a determining module 1001 and a sending module 1002. The determining module 1001 is configured to determine information that is about a radio access network notification area RNA and that is to be sent to a terminal, where the information about the RNA includes identification information of at least one first radio access network area or identification information of at least one first tracking area. The sending module 1002 is configured to send the information about the RNA and identification information of at least one cell to the terminal.

In FIG. 10, further, identification information of a radio access network area to which each of the at least one cell belongs to the identification information, of the at least one first radio access network area, that is included in the information about the RNA, or identification information of a tracking area to which each of the at least one cell belongs to the identification information, of the at least one first tracking area, that is included in the information about the RNA.

In a possible manner, the communications apparatus 100 may further include a receiving module 1003. The receiving module 1003 is configured to receive, from a second network device, identification information of a radio access network area or a tracking area to which a cell corresponding to the second network device belongs, and/or receive, from a second network device, identification information of a radio access network area or a tracking area to which a cell corresponding to a third network device belongs.

In the foregoing embodiment, the at least one cell may be determined based on the cell corresponding to the second network device and/or the cell corresponding to the third network device.

In another possible manner, the receiving module 1003 is further configured to receive, from a core network node, identification information of at least one second radio access network area and identification information of a cell corresponding to each of the at least one second radio access network area, or receive, from a core network node, identification information of at least one second tracking area and identification information of a cell corresponding to each of the at least one second tracking area.

In the foregoing embodiment, the at least one cell may be determined based on the identification information of the at least one second radio access network area and the identification information of the cell corresponding to each of the at least one second radio access network area, or the at least one cell is determined based on the identification information of the at least one second tracking area and the identification information of the cell corresponding to each of the at least one second tracking area.

The communications apparatus in the embodiment shown in FIG. 10 may be configured to execute the technical solutions in the foregoing method embodiments. For implementation principles and technical effects of the communications apparatus, refer to corresponding descriptions in the method embodiments. Details are not described herein again. Optionally, the communications apparatus may be a base station, or may be a component (such as a chip or a circuit) of the base station.

Figure 11:
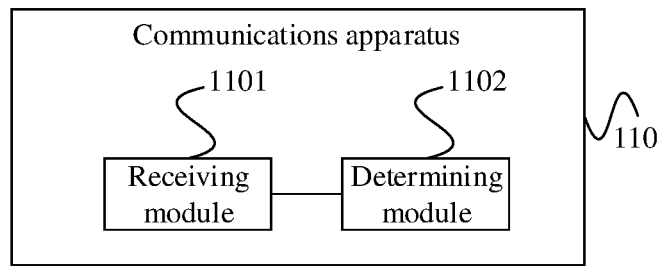
FIG. 11 is a schematic structural diagram of a communications apparatus according to an embodiment of this application.

FIG. 11 is a schematic structural diagram of another communications apparatus according to an embodiment of this application. As shown in FIG. 11, the communications apparatus 110 includes a receiving module 1101 and a determining module 1102. The receiving module 1101 is configured to receive, from a network device, information about a radio access network notification area RNA and identification information of at least one cell, where the information about the RNA includes identification information of at least one radio access network area or identification information of at least one tracking area. The determining module 1102 is configured to determine, based on identification information of a current cell of a terminal and the identification information of the at least one cell, whether to send a radio access network notification area update RNAU notification message. Identification information of a radio access network area to which the current cell belongs to the identification information, of the at least one radio access network area, that is included in the information about the RNA, or identification information of a tracking area to which the current cell belongs to the identification information, of the at least one tracking area, that is included in the information about the RNA.

In FIG. 11, further, identification information of a radio access network area to which each of the at least one cell belongs to the identification information, of the at least one radio access network area, that is included in the information about the RNA, or identification information of a tracking area to which each of the at least one cell belongs to the identification information, of the at least one tracking area, that is included in the information about the RNA.

In a possible manner, the determining module 1102 may be configured to when the identification information of the current cell is the same as identification information of any one of the at least one cell, determine to send the RNAU notification message to the network device, where the identification information of the at least one cell is used to indicate the terminal to camp on any one of cells corresponding to the identification information of the at least one cell, and send the RNAU notification message to a network device of the cell on which the terminal currently camps.

In another possible manner, the determining module 1102 may be configured to when the identification information of the current cell is different from identification information of each of the at least one cell, determine to send the RNAU notification message to the network device, where the identification information of the at least one cell is used to indicate the terminal to camp on any cell other than a cell corresponding to the identification information of the at least one cell, and send the RNAU notification message to a base station of the cell on which the terminal currently camps.

The communications apparatus in the embodiment shown in FIG. 11 may be configured to execute the technical solutions in the foregoing method embodiments. Implementation principles and technical effects of the communications apparatus are similar to those of the method embodiments. Details are not described herein again. Optionally, the communications apparatus may be a terminal, or may be a component (such as a chip or a circuit) of the terminal.

It should be understood that division of the modules in the communications apparatuses in FIG. 8 to FIG. 11 is merely logical function division. In actual implementation, all or some of the modules may be integrated into one physical entity, or the modules may be physically separated. In addition, the modules may be all implemented in a form of software invoked by using a processing element, or may be implemented in a form of hardware, or some modules may be implemented in a form of software invoked by using a processing element and some modules may be implemented in a form of hardware. For example, a determining module may be a processing element disposed separately, or may be integrated into a communications apparatus, for example, may be implemented in a chip of a terminal. In addition, the determining module may be stored in a memory of the communications apparatus in a form of a program, and invoked by a processing element of the communications apparatus to perform functions of the determining module. Implementation of other modules is similar to this. In addition, all or some of the modules may be integrated together or may be implemented separately. The processing element herein may be an integrated circuit and has a signal processing capability. In an implementation process, steps in the foregoing methods or the foregoing modules can be implemented by using an integrated logic circuit of hardware in the processing element, or by using instructions in a form of software.

For example, the foregoing modules may be configured as one or more integrated circuits for performing the foregoing methods, for example, one or more application-specific integrated circuits (Application Specific Integrated Circuit, ASIC), one or more microprocessors (DSP), or one or more field programmable gate arrays (Field Programmable Gate Array, FPGA). For another example, when one of the modules is implemented in a form of a program invoked by the processing element, the processing element may be a general-purpose processor, for example, a central processing unit (CPU) or another processor that can invoke a program. For another example, the modules may be integrated together and implemented in a form of a system-on-a-chip (SOC).

Figure 12:
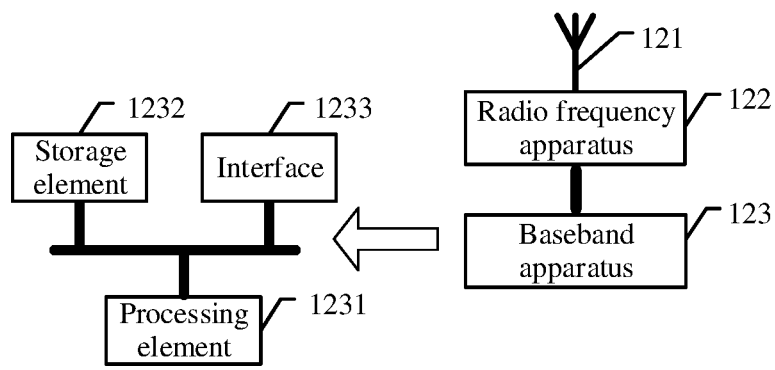
FIG. 12 is a schematic structural diagram of still another communications apparatus according to an embodiment of this application.

FIG. 12 is a schematic structural diagram of still another communications apparatus according to an embodiment of this application. The communications apparatus may be specifically a base station. As shown in FIG. 12, the base station includes an antenna 121, a radio frequency apparatus 122, and a baseband apparatus 123. The antenna 121 is connected to the radio frequency apparatus 122. In an uplink direction, the radio frequency apparatus 122 receives, by using the antenna 121, information sent by a terminal, and sends, to the baseband apparatus 123 for processing, the information sent by the terminal. In a downlink direction, the baseband apparatus 123 processes the information of the terminal, and sends the information to the radio frequency apparatus 122. The radio frequency apparatus 122 processes the information of the terminal, and sends the information to the terminal by using the antenna 121.

The foregoing communications apparatus may be located in the baseband apparatus 123. In an implementation, the foregoing modules are implemented in a form of a program invoked by a processing element. For example, the baseband apparatus 123 includes a processing element and a storage element, and the processing element 1231 invokes a program stored in the storage element 1232 to perform the methods in the foregoing method embodiments. In addition, the baseband apparatus 123 may further include an interface 1233, configured to exchange information with the radio frequency apparatus 122. The interface is, for example, a common public radio interface (CPRI).

In another implementation, the foregoing modules may be configured as one or more processing elements for implementing the foregoing methods. These processing elements are disposed on the baseband apparatus 123. The processing element herein may be an integrated circuit, for example, one or more ASICs, one or more DSPs, or one or more FPGAs. The integrated circuits may be integrated together to form a chip.

For example, the foregoing modules may be integrated together and implemented in a form of a system-on-a-chip (SOC). For example, the baseband apparatus 123 includes an SOC chip, and the SOC chip is configured to implement the foregoing methods. The processing element 1231 and the storage element 1232 may be integrated into the chip, and the processing element 1231 invokes a program stored in the storage element 1232, to implement the foregoing methods or functions of the foregoing modules. Alternatively, at least one integrated circuit may be integrated into the chip to implement the foregoing methods or functions of the foregoing modules. Alternatively, the foregoing implementations may be combined, functions of some modules are implemented by the processing element by invoking programs, and functions of some modules are implemented by using an integrated circuit.

Regardless of a used manner, the communications apparatus includes at least one processing element, a storage element, and a communications interface, and the at least one processing element is configured to perform the methods provided in the foregoing method embodiments. The processing element may perform some or all of the steps in the foregoing method embodiments in a first manner of executing the program stored in the storage element, or in a second manner of using an integrated logic circuit of hardware in the processing element with reference to an instruction. Certainly, the methods provided in the foregoing method embodiments may alternatively be performed by combining the first manner with the second manner.

Same as that in the foregoing description, the processing element herein may be a general-purpose processor, for example, a central processing unit (CPU), or may be configured as one or more integrated circuits that perform the foregoing methods, for example, one or more application-specific integrated circuits (ASIC), one or more microprocessors (digital signal processor, DSP), or one or more field programmable gate arrays (FPGA). The storage element may be a memory, or may be a general name for a plurality of storage elements.

Figure 13:
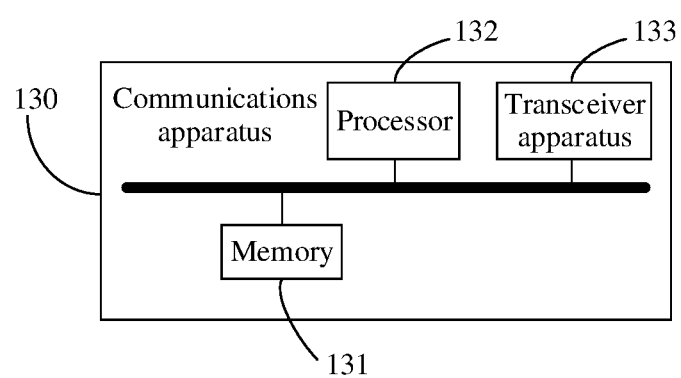
FIG. 13 is a schematic structural diagram of still another communications apparatus according to an embodiment of this application.

FIG. 13 is a schematic structural diagram of still another communications apparatus according to an embodiment of this application. As shown in FIG. 13, a communications apparatus 130 includes a processor 132 and a transceiver apparatus 133. The transceiver apparatus 133 is configured to receive, from a network device, information about a radio access network notification area RNA and identification information of at least one cell, where the information about the RNA includes identification information of at least one radio access network area or identification information of at least one tracking area. The processor 132 is configured to determine, based on identification information of a current cell of a terminal and the identification information of the at least one cell, whether to send a radio access network notification area update RNAU notification message. Identification information of a radio access network area to which the current cell belongs to the identification information, of the at least one radio access network area, that is included in the information about the RNA, or identification information of a tracking area to which the current cell belongs to the identification information, of the at least one tracking area, that is included in the information about the RNA. Further, the communications apparatus 130 further includes a memory 131, configured to store a computer program or an instruction. The processor 132 is configured to invoke the program or the instruction.

The communications apparatus in the embodiment shown in FIG. 13 may be configured to execute the technical solutions in the foregoing method embodiments. For implementation principles and technical effects of the communications apparatus, refer to related descriptions in the method embodiments. Details are not described herein again. Optionally, the communications apparatus may be a terminal, or may be a component (such as a chip or a circuit) of the terminal.

In FIG. 13, the transceiver apparatus 133 may be connected to an antenna. In a downlink direction, the transceiver apparatus 133 receives, by using the antenna, information sent by a base station, and sends the information to the processor 132 for processing. In an uplink direction, the processor 132 processes data of the terminal, and sends the data to the base station by using the transceiver apparatus 133.

Optionally, the processor 132 may be configured to implement a corresponding function of the determining module 1102 in the communications apparatus shown in FIG. 11, and the transceiver apparatus may be configured to implement a corresponding function of the receiving module 1101 in the communications apparatus shown in FIG. 11. Alternatively, some or all of the foregoing modules may be implemented by using an integrated circuit that is embedded in a chip of the terminal. In addition, the modules may be implemented separately, or may be integrated together. In other words, the foregoing modules may be configured as one or more integrated circuits for performing the foregoing methods, for example, one or more application-specific integrated circuits (Application Specific Integrated Circuit, ASIC), one or more microprocessors (DSP), or one or more field programmable gate arrays (FPGA).

An embodiment of this application further provides a computer readable storage medium, where the computer readable storage medium stores a computer program. When the computer program is run on a computer, the computer is enabled to perform the communication methods in the foregoing embodiments.

In addition, an embodiment of this application further provides a computer program product, where the computer program product includes a computer program. When the computer program is run on a computer, the computer is enabled to perform the communication methods in the foregoing embodiments.

All or some of the foregoing embodiments may be implemented through software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

What is claimed is:

1. A communications method, comprising:
 receiving, by a second network device, from a third network device, first identification information of a first radio access network area to which a first cell corresponding to the third network device belongs, wherein the first identification information is sent by the third network device in response to the second network device sending, to the third network device, fifth identification information of a second radio network area, and wherein a second cell corresponding to the second network device belongs to the second radio network area; and
 sending, by the second network device, second identification information of the first cell and the first identification information of the first radio access network area to a first network device for determining radio access network area information to be sent to a terminal, wherein the radio access network area information comprises identification information of at least one radio access network area;
 wherein the first identification information comprises a radio access network area code of the first radio access network area to which the first cell corresponding to the third network device belongs.

2. The method according to the claim 1, further comprising:
 receiving, by the second network device, the second identification information from the third network device.

3. The method according to claim 1, wherein an area identified by the radio access network area code comprises one or more cells.

4. The method according to claim 1, further comprising:
 sending, by, the second network device, third identification information of the second cell corresponding to the second network device and a fourth identification information of the second radio network area to which the second cell belongs to the first network device.

5. The method according to claim 4, wherein the fourth identification information comprises a second radio access network area code.

6. The method according to claim 5, wherein an area identified by the second radio access network area code comprises one or more cells.

7. The method of claim 1, wherein the sending the second identification information and the first identification information a first network device comprises sending, by the second network device, the second identification information of the first cell and the first identification information of the first radio access network area to the first network device through an Xn interface.

8. The method of claim 1, further comprising sending, by the first network device, to a terminal, the second identification information of the first cell and the first identification information of the first radio access network area.

9. The method of claim 1, further comprising using, by the first network device, the first cell in a blacklist for a radio access network notification area update RNAU notification message by a terminal in response to the first cell not having a direct Xn interface with the third network device and further in response to the radio access network area code of the first radio access network area being the same as a third radio access network area code of a third radio access network area to which a third cell corresponding to the first network device belongs.

10. A communications method, comprising:
  receiving, by a first network device, a first identification information of a first radio access network area to which a first cell corresponding to a third network device belongs, wherein the first identification information is sent by a second network device in response to the first network device sending, to the second network device, fifth identification information of a second radio network area, and wherein a second cell corresponding to the second network device belongs to the second radio network area;
  receiving, by the first network device, second identification information of the first cell from the second network device;
  receiving, by the first network device, from the second network device, third identification information of a second cell corresponding to the second network device;
  receiving, by the first network device, from the second network device, fourth identification information of a second radio network area to which the second cell belongs; and
  determining, by the first network device, radio access network area information to be sent to a terminal according to one or both of the first identification information and the second identification information, or according to one or both of the third identification information and the fourth identification information, wherein the radio access network area information comprises identification information of at least one radio access network area;
  wherein the first identification information comprises a first radio access network area code of the first radio access network area to which the first cell corresponding to the third network device belongs and the fourth identification information comprises a second radio access network area code of the second radio network area to which the second cell belongs.

11. The method according to claim 10, wherein an area identified by the first radio access network area code comprises one or more cells, and wherein an area identified by the second radio access network area code comprises one or more cells.

12. The method of claim 10, wherein the third identification information the fourth identification information are received, by the first network device, from the second network device, through an Xn interface.

13. The method of claim 10, further comprising sending, by the first network device, to a terminal, the second identification information of the first cell and the first identification information of the first radio access network area.

14. The method of claim 10, further comprising using, by the first network device, the first cell in a blacklist for a radio access network notification area update RNAU notification message by a terminal in response to the first cell not having a direct Xn interface with the third network device and further in response to the radio access network area code of the first radio access network area being the same as a third radio access network area code of a third radio access network area to which a third cell corresponding to the first network device belongs.

15. A communications system, comprising:
  a first network device; and
  a second network device;
  wherein the first network device is configured to receive, from the second network device, first identification information of a first radio access network area to which a first cell corresponding to a third network device belongs, wherein the first identification information is sent by the second network device in response to the first network device sending, to the second network device, fifth identification information of a second radio network area, and wherein a second cell corresponding to the second network device belongs to the second radio network area, wherein the first network device is further configured to receive, from the second network device, second identification information of the first cell, wherein the first network device is further configured to receive, from the second network device, third identification information of the second cell corresponding to the second network device, and wherein the first network device is further configured to receive, from the second network device, fourth identification information of the second radio network area to which the second cell belongs;
  wherein the first network device is further configured to determine radio access network area information to be sent to a terminal according to one or both of the first identification information and the second identification information, or according to one or both of the third identification information and the fourth identification information, wherein the radio access network area information comprises identification information of at least one radio access network area;
  wherein the second network device is configured to receive, from the third network device, the first identification information of the first radio access network area; and
  wherein the first identification information comprises a radio access network area code of the first radio access network area to which the first cell corresponding to the third network device belongs.

16. The system according to claim 15, further comprising the third network device, configured to send, to the second network device, the first identification information of the first radio access network area.

17. The system according to claim 16, wherein the third network device is further configured to send the second identification information to the second network device.

18. The system of claim 15, wherein the first network device is configured to receive the first identification information, the second identification information, third identification information, and the fourth identification information from the second network device through an Xn interface.

\* \* \* \* \*